(12) United States Patent
Breed et al.

(10) Patent No.: US 6,748,797 B2
(45) Date of Patent: Jun. 15, 2004

(54) METHOD AND APPARATUS FOR MONITORING TIRES

(75) Inventors: David S. Breed, Boonton Township, Morris County, NJ (US); Wilbur E. DuVall, Kimberling City, MO (US); Wendell C. Johnson, Signal Hill, CA (US)

(73) Assignee: Automotive Technologies International Inc., Denville, NJ (US)

( * ) Notice: Subject to any disclaimer, the term of this patent is extended or adjusted under 35 U.S.C. 154(b) by 217 days.

(21) Appl. No.: 09/765,558

(22) Filed: Jan. 19, 2001

(65) Prior Publication Data

US 2002/0095980 A1 Jul. 25, 2002

Related U.S. Application Data

(60) Provisional application No. 60/231,378, filed on Sep. 8, 2000.

(51) Int. Cl.$^7$ ............................................. G01M 17/02
(52) U.S. Cl. ........................................ 73/146; 340/443
(58) Field of Search ................................. 73/146, 146.2, 73/146.3, 146.4, 146.5, 146.8; 374/141, 143, 144

(56) References Cited

U.S. PATENT DOCUMENTS

| | | | |
|---|---|---|---|
| 5,228,337 A | 7/1993 | Sharpe et al. ............... 73/146.5 |
| 5,293,308 A | 3/1994 | Boys et al. .................... 363/37 |
| 5,450,305 A | 9/1995 | Boys et al. .................... 363/24 |
| 5,528,113 A | 6/1996 | Boys et al. .................... 318/16 |
| 5,600,301 A | 2/1997 | Robinson, III ............... 340/442 |
| 5,619,078 A | 4/1997 | Boys et al. .................... 307/85 |
| 5,767,592 A | 6/1998 | Boys et al. ................... 307/108 |
| 5,821,638 A | 10/1998 | Boys et al. ................... 307/104 |
| 5,838,229 A | 11/1998 | Robinson, III ............... 340/442 |
| 5,839,554 A | 11/1998 | Clark ........................... 191/10 |
| 5,880,363 A | 3/1999 | Meyer et al. ............... 73/146.5 |
| 5,898,579 A | 4/1999 | Boys et al. .................... 363/23 |
| 5,939,977 A | 8/1999 | Monson ....................... 340/442 |
| 5,963,128 A | 10/1999 | McClelland ................. 340/447 |
| 6,005,480 A | 12/1999 | Banzhof et al. ............. 340/447 |
| 6,031,737 A | 2/2000 | Green .......................... 363/37 |
| 6,034,597 A | 3/2000 | Normann et al. ........... 340/447 |
| 6,043,738 A | 3/2000 | Stewart et al. .............. 340/447 |
| 6,053,038 A | 4/2000 | Schramm et al. .......... 73/146.5 |
| 6,101,870 A | 8/2000 | Kato et al. .................. 73/146.8 |
| 6,112,585 A | 9/2000 | Schrottle et al. ............. 73/146 |
| 2002/0092345 A1 | 7/2002 | Van Niekerk et al. ........ 73/146 |

OTHER PUBLICATIONS

Design and Development of a MEMS–IDT Gyroscope, V.K. Varadan et al., Smart Mater. Struct. vol. 9, Jul. 21, 2000, pp. 898–905.

Microsensors, Microelectromechanical Systems (MEMS), and Electronics for Smart Structures and Systems, V.K. Varadan et al., Smart Mater. Struct., vol. 9, Feb., 1999, pp. 953–972.

Abstract of Wireless Remote Accelerometer, V.K. Varadan et al., in Physics of Semiconductor Devices, vol. 1: Proceedings of the $9^{th}$ International Workshop on Physics of Semiconductor Devices (IWPSD), Delhi, India, Dec. 6–20, 1997.

*Primary Examiner*—Edward Lefkowitz
*Assistant Examiner*—Andre Allen
(74) *Attorney, Agent, or Firm*—Brian Roffe

(57) ABSTRACT

Arrangement and method for monitoring tires mounted to the vehicle in which thermal radiation detecting devices are arranged external of and apart from the tires for detecting the temperature of the tires. The detected temperature of the tires is analyzed, e.g., relative to a threshold or as to the magnitude of a difference between mated tires, and an action is effected in response to the analysis. The thermal radiation detecting devices are preferably supplied with power wirelessly, e.g., through an inductive system, a capacitive system or a radio frequency energy transfer system.

60 Claims, 8 Drawing Sheets

METHOD AND APPARATUS FOR MONITORING TIRES

CROSS REFERENCE TO RELATED APPLICATION

This application claims priority under 35 U.S.C. §119(e) of U.S. provisional patent application Ser. No. 60/231,378 filed Sep. 8, 2000.

FIELD OF THE INVENTION

This invention relates to monitoring tires of a vehicle and more particularly to monitoring the tires by measuring the temperature of the tires.

The invention also relates to the application of a wireless power system for controlling power transfer and communication between sensors and transducers mounted on the vehicle, such as tire monitoring sensors, and other systems or devices in the vehicle.

BACKGROUND OF THE INVENTION

In August, 2000, Bridgestone/Firestone Inc. recalled approximately 6.5 million Firestone ATX, ATX II and Wilderness AT tires used primarily on Ford Motor Co. light trucks and sport utility vehicles, including Ford's best-selling Explorer. The National Highway Traffic Safety Administration (NHTSA) is investigating Firestone tires in connection with at least 101 U.S. traffic deaths and more than about 400 injuries. Most of the Firestone tire deaths occurred when the tires came apart while on Ford Explorers, causing the vehicles to roll over.

Bridgestone/Firestone has been criticized for not ordering a recall sooner, even though the company's data on claims for injuries and property damage indicated problems with the tires at least as early as 1997. Ford received harsh criticism after the Firestone recall because it acknowledged ordering its own recall of the same tires in 16 other countries after receiving reports of problems. The foreign recalls began more than a year before the U.S. recall, but Ford never alerted NHTSA. Ford was not required by law to report the foreign recalls.

Spurred in particular by the recent problems with Firestone tires, the U.S. House of Representatives passed a bill requiring vehicle rollover testing and installation of systems to warn of under-inflated tires. It would allow stiff prison sentences for automotive industry executives who hide safety problems. According to the bill, there would be a 15-year sentence for officials who withhold information on defective products from government investigators. It also includes a safe harbor provision that would allow whistle-blowers to report the defects within a reasonable amount of time without being punished. Moreover, companies would have to tell NHTSA about tire recalls overseas.

The House bill also would require that all vehicles have warning indicators for low tire pressure and it includes a provision requiring NHTSA to develop driving tests to determine vehicle rollover risk instead of the simple mathematical formula the agency plans to use.

It is not uncommon for an automotive vehicle today to have many motors, other actuators, lights etc., controlled by one hundred or more switches and fifty or more relays and connected together by almost five hundred meters of wire, and close to one thousand pin connections grouped in various numbers into connectors. It is not surprising therefore that the electrical system in a vehicle is by far the most unreliable system of the vehicle and the probable cause of most warranty repairs.

Unfortunately, the automobile industry is taking a piecemeal approach to solving this problem when a revolutionary approach is called for. Indeed, the current trend in the automotive industry is to group several devices of the vehicle's electrical system together which are located geometrically or physically in the same area of the vehicle and connect them to a zone module which is then connected by communication and power buses to the remainder of the vehicle's electrical system. The resulting hybrid systems still contain substantially the same number and assortment of connectors with only about a 20% reduction in the amount of wire in the vehicle.

In view of the foregoing, it has been suggested to couple a pressure sensor to the tires on a vehicle and wirelessly transmit a signal representative of the sensed pressure to a control module on the vehicle proper.

It is known to use internal-to-vehicle mechanisms for monitoring the air pressure of the tires of a vehicle. These mechanisms have a stationary device which interacts with a device that co-moves with the respective wheel of the vehicle in such a way that monitoring of the air pressure can take place during operation of the vehicle. The co-moving device uses suitable means to sense the air pressure, and transmits an output-related signal to the stationary device if the air pressure falls below a certain value. A prerequisite for operation of these systems is that the co-moving device have an energy supply, for example a small battery rotating along with the wheel being monitored. This configuration must therefore be included in ongoing maintenance cycles so that a battery exchange is performed at the proper time. The battery exchange leads to additional costs. Moreover, the mass of the rotating wheel is influenced by the requisite battery device; in particular, an asymmetrical mass distribution results, which requires additional counterweights. Overall wheel balance is therefore degraded.

With respect to pressure sensors mounted on tires, U.S. Pat. No. 5,228,337 to Sharpe, et al. describes tire pressure and temperature measurement system in which the vehicle wheel tire inflation pressure is measured in real time by a sensor assembly mounted on a rotary part of the wheel. The assembly includes a piezoresistive cell exposed to inflation gas pressure and an electronics module comprising an assembly of three printed circuit boards (PCB). A power signal transmitted from the vehicle to the electronics module via a rotary transformer is conditioned by PCB to provide an energizing signal for the cell. Pressure and temperature signals output by the cell are received by the PCB and converted to digital form before being applied to address locations in a look-up table of PCB which holds pre-calibrated cell outputs. Data from the look-up table is processed to obtain a corrected real time pressure value which is transmitted to the vehicle. If desired, a temperature value may also be transmitted.

U.S. Pat. Nos. 5,600,301 and 5,838,229 to Robinson, III describe a remote tire pressure monitoring system employing coded tire identification and radio frequency transmission, and enabling recalibration upon tire rotation or replacement. The system indicates low tire pressure in vehicles, in which each vehicle wheel has a transmitter with a unique code, i.e., the transmitter is internal of the tire. A central receiver in the vehicle is taught, at manufacture, to recognize the codes for the respective transmitters for the vehicle, and also a common transmitter code, in the event one of the transmitters needs to be replaced. During vehicle operation and maintenance, when the tires are rotated, the system can be recalibrated to relearn the locations of the transmitters. The transmitters employ surface acoustic wave devices. An application specific integrated circuit encoder in each transmitter is programmed at manufacture, in accordance with its unique code, to send its information at different intervals, to avoid clash between two or more transmitters on the vehicle. The transmitters are powered by long-life batteries.

U.S. Pat. No. 5,880,363 to Meyer, et al. describes a method for checking air pressure in vehicle wheel tires wherein a pressure signal characteristic for the air pressure in the tire is picked up as a measured signal by a measurement device located in or on the tire of each motor vehicle wheel. A data signal containing a measured air pressure value derived from the pressure signal as well as an identification value characteristic for the respective transmitter device is generated and output by a transmitter device located in or on the tire of each motor vehicle wheel. The data signal output by the transmitter devices will be received by a reception device located at a distance to the motor vehicle wheels. The identification value of the transmitter device contained in the data signal will be compared by a control unit to identification comparison values assigned to the respective transmitter devices such that further processing of the data signal by the control unit will be effected only, if the identification value and the identification comparison value meet a specified assignment criterion. A drawback of this device is that it also uses a battery.

U.S. Pat. No. 5,939,977 to Monson describes a method and apparatus for remotely measuring the pressure and temperature of the gas in a vehicle wheel. The vehicle includes a frame member, a vehicle wheel mounted for rotation relative to the frame member about a rotation axis, and a modulator mounted on the vehicle wheel for movement therewith. The modulator generates a carrier signal including a first component encoding a plurality of consecutive data signals corresponding to a physical characteristic of the vehicle wheel, and the carrier signal including a second component identifying a portion of the respective one of the data signals U.S. Pat. No. 5,963,128 to McClelland describes a remote tire pressure monitoring system which monitors a vehicle's tire pressures and displays real-time pressure values on a dashboard display while the vehicle is on the road. An electronic unit with pressure sensor, roll switch, reed switch, tilt switch, battery and control electronic, mounted to the valve stem inside each tire uses the pressure sensor to periodically measure the tire pressure, and uses a transmitter to transmit the measured pressure values, via RF transmission, to a dashboard mounted receiver. The receiver controls a display which indicates to the driver the real-time tire pressure in each wheel. The display also indicates an alarm condition when the tire pressure falls below certain predefined thresholds. The pressure values are compensated for temperature changes inside the tire, and also may be compensated for altitude changes.

U.S. Pat. No. 6,005,480 to Banzhof, et al. describes a snap-in tire valve including a valve body surrounded in part by a resilient element that forms an annular sealing surface configured to snap in place into a valve opening of a wheel. A tire pressure radio-frequency sending unit is mounted to the valve body, and a column extends from the sending unit. The region between the resilient element and the pressure sending unit defines an expansion volume that receives displaced portions of the resilient element during snap-in insertion of the valve body into a wheel opening, thereby facilitating insertion. Preferably the column defines a central passageway to facilitate insertion using standard insertion tools. In one version, two batteries are included in the sending unit, disposed on opposite sides of the column.

U.S. Pat. No. 6,034,597 to Norman, et al. describes a method for processing signals of a tire pressure monitoring system on vehicles in which a transmitter is mounted on each wheel of the vehicle and a reception antenna allocated to each transmitter is connected to the input of a common receiver. The transmitters transmit, at time intervals, data telegrams which contain an individual identifier and a data portion following the latter. The signals received simultaneously from the reception antennas and having the same identifier are conveyed in summed fashion to the receiver in a set manner.

U.S. Pat. No. 6,043,738 to Stewart, et al. describes a remote tire pressure monitoring system includes a sending unit for each monitored tire, and the sending units transmit RF signals, each including an identifier and a pressure indicator. A receiver operates in a learn mode in which the receiver associates specific identifiers either with the vehicle or with specific tires. During the learn mode the vehicle is driven at a speed above a threshold speed, such as thirty miles an hour, and identifiers are associated with either the vehicle or the respective tires of the vehicle only if they persist for a selected number of signals or frames during the learning period. In one example, the tires are inflated with different pressures according to a predetermined pattern, and the pressure indicators of the receive signals are used to associate individual tire positions with the respective sending units.

U.S. Pat. No. 6,046,672 to Pearman describes a tire condition indicating device having a detector for detecting the condition of a tire on a wheel of a vehicle rotatable about a wheel axis, preferably for detecting pressure of the tire. A signal emitter emits a signal when the detector detects the condition and a power supply device provides power to the signal emitter. The power supply device has an electric power generator including first and second parts that are relatively rotatable about a generator axis, the first part connected to the wheel to rotate.

U.S. Pat. No. 6,053,038 to Schramm, et al. describes an internal-to-vehicle mechanism for monitoring the air pressure of a tire of a vehicle. The mechanism includes a sensor, detecting the tire pressure, which rotates, together with an electrotechnical first device, synchronously with the wheel and which, as a function of the tire air pressure that is determined, modifies parameters of the first device, namely the energy uptake of the first device. A stationary electrotechnical second device radiates an electric and/or magnetic, in particular electromagnetic, field through which the first device passes at, preferably, each wheel rotation with an uptake of energy from the field. A monitoring device detects the energy uptake and/or energy release of the second device.

U.S. Pat. No. 6,101,870 to Kato, et al. describes a device for monitoring the air pressure of a wheel. The device prevents a decrease in the transmission level of radio waves caused by impedance mismatch between an antenna, which radiates the radio waves, and a circuit, which produces signals that are to be radiated as the radio waves. The device includes a valve stem through which air is charged. The valve stem extends through a vehicle wheel. A transmitter is secured to the wheel to transmit a signal representing the air pressure of the wheel to a receiver installed in the vehicle. The device further includes a case attached to the wheel. The case is connected to the valve stem. An electric circuit is accommodated in the case to detect the air pressure and convert the detected pressure to an electric signal. An antenna radiates the signal produced by the electric circuit and is arranged about the valve stem. A conveying mechanism conveys the signals produced by the electric circuit to the antenna.

U.S. Pat. No. 6,112,585 to Schrottle, et al. describes a tire pressure monitoring device for a vehicle having several wheels comprises a central receiving and evaluation device at the vehicle. A receiving antenna is arranged stationarily at the vehicle structure adjacent to at least each active wheel and thus attributed to that specific wheel. All receiving antennas are connected via a distinctive connecting line with a single receiver means. The receiver means comprises a multiplexer-circuit connecting per time interval only one single selected receiving antenna or several selected receiving antennas with the receiving means. Further, the receiver means sense a field strength of each specific radiogram and thus select the specific receiving antenna comprising the highest field strength of a received radiogram during the specific time interval. Thus, central evaluation means may attribute a specific radiogram to the specific wheel arranged adjacent to the receiving antenna comprising the highest field strength of a received radiogram during the specific time interval.

None of these patents show a temperature sensor mounted entirely at a location external of and apart from the tire and coupling the temperature sensor with a unit capable of receiving power either inductively or through radio frequency energy transfer in order to enable the temperature sensor to conduct a temperature measurement. Rather, all of the tire monitoring systems entail the use of a sensor or other device mounted on the tire or formed in connection with the tire.

All of the foregoing patents are incorporated by reference herein to the extent necessary to, e.g., provide an adequate written disclosure of the invention and enable the manufacture and use of the invention.

OBJECTS AND SUMMARY OF THE INVENTION

It is an object of the present invention to provide new and improved method and apparatus for monitoring tires.

It is another object of the present invention to provide a new and improved method and apparatus for monitoring tires using a sensor mounted entirely at a location external of an apart from the tires.

It is still another object of the present invention to provide a new and improved wireless system for controlling power transfer and communication between a tire monitoring sensor and other systems or devices in the vehicle.

Preferred embodiments of the invention are described below and unless specifically noted, it is the applicants' intention that the words and phrases in the specification and claims be given the ordinary and accustomed meaning to those of ordinary skill in the applicable art(s). If applicants intend any other meaning, they will specifically state they are applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C.§112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. §112, sixth paragraph, it is nonetheless their intention to cover and include any and all structure, materials or acts that perform the claimed function, along with any and all known or later developed equivalent structures, materials or acts for performing the claimed function.

In order to achieve these objects, a vehicle including an arrangement for monitoring tires in accordance with the invention comprises thermal radiation detecting means arranged external of and apart from the tires for detecting the temperature of the tires, processor means coupled to the thermal radiation detecting means for receiving the detected temperature of the tires and determining whether a difference in thermal radiation is present between associated mated pairs of the tires, and response means coupled to the processor means for responding to the determined difference in thermal radiation between mated pairs of the tires. Instead of determining whether a difference in thermal radiation is present between associated mated pairs of tires, a comparison or analysis may be made between the temperature of the tires individually and a predetermined value or threshold to determine the status of the tires, e.g., properly inflated, underinflated or delaminated, and appropriate action by the response means is undertaken in light of the comparison or analysis. The analysis may be in the form of a difference between the absolute temperature and the threshold temperature. Even more simpler, an analysis of the detected temperature of each tire may be used and considered in a determination of whether the tire is experiencing or is about to experience a problem. Such an analysis would not necessarily entail comparison to a threshold.

The determination of which tires constitute mated pairs is made on a vehicle-by-vehicle basis and depends on the location of the tires on the vehicle. It is important to determine which tires form mated pairs because such tires should ideally have the same pressure and thus the same temperature. As a result, a difference in temperature between tires of a mated pair will usually be indicative of a difference in pressure between the tires. Such a pressure difference might be the result of under-inflation of the tire or a leak. One skilled in the art of tire inflation and maintenance would readily recognize which tires must be inflated to the same pressure and carry substantially the same load so that such tires would form mated pairs.

For example, for a conventional automobile with four tires, the mated pairs of tires would be the front tires and the rear tires. The front tires should be inflated to the same tire pressure and carry the same load so that they would have the same temperature, or have different temperatures within an allowed tolerance. Similarly, the rear tires should be inflated to the same tire pressure and carry the same load so that they would have the same temperature, or have different temperatures within an allowed tolerance.

It is also conceivable that three or more tires on the vehicle should be at the same temperature and thus form a plurality of mated pairs, i.e., the designation of one tire as being part of one mated pair does not exclude the tire from being part of another mated pair. Thus, if three tires should be at the same temperature and they each have a different temperature, this would usually be indicative of different pressures and thus would give rise to a need to check each tire.

The thermal radiation detecting means are coupled to the processor means, preferably in a wireless manner, however wires can also be used alone or in combination with a wireless technique. For example, suitable coupling means may include a transmitter mounted in connection with the thermal radiation detecting device and a receiver mounted in connection with or integrated into the processor. Any of the conventions for wirelessly transmitting data from a plurality of tire pressure-measuring sensors to a common receiver or multiple receivers associated with a single processor, as discussed in the U.S. patents above, may be used in accordance with the invention.

The thermal radiation detecting means may comprise infrared radiation receivers each arranged to have a clear field of view of at least one tire. The receivers may be arranged in any location on the vehicle from which a view of at least a part of the tire surface can be obtained. For example, the receivers may be arranged in the tire wells around the tires, on the side of the vehicle and on side mounted rear view mirrors.

In order to supply power to the thermal radiation detecting means or devices, several innovative approaches are possible in addition to directly connected wires. Preferably, power is supplied wirelessly, e.g., inductively, through radio frequency energy transfer or capacitively. In the inductive power supply arrangement, the vehicle is provided with a pair of looped wires arranged to pass within a short distance from power receiving means electrically coupled to the thermal radiation detecting devices, i.e., the necessary circuitry and electronic components to enable an inductive current to develop between the pair of looped wires and a wire of the power receiving means such as disclosed in U.S. Pat. Nos. 5,293,308, 5,450,305, 5,528,113, 5,619,078, 5,767,592, 5,821,638, 5,839,554, 5,898,579 and 6,031,737 which are incorporated herein by reference.

Current flows through the pair of looped wires and is transferred through inductance to the wire of the power receiving means which then energize the thermal radiation detecting component of the thermal radiation detecting devices. Instead of a circuit for receiving power through inductance from the pair of looped wires, the power receiving means can be a circuit designed to receive power through radio frequency energy transfer. As such, when the set radio frequency is transmitted and then received by the power receiving means, it is actuated to energize the thermal radiation detecting component.

The response means include an alarm for emitting noise into the passenger compartment, a warning light for emitting light into the passenger compartment from a specific location and a telecommunications unit for sending a signal to a remote vehicle service facility.

In one exemplifying embodiment disclosed herein, the thermal radiation detecting means comprises detector means for generating an output signal responsive to thermal emitted radiation means for defining first and second fields of view relative to the detector means, the first field of view encompassing a first one of the mated pair of tires and the second field of view encompassing a second one of the mated pair of tires, switching means for switching the field of view detected to generate a combined output signal and means for deriving an indication of a proximate object from the combined output signal. Switching between the first and second fields of view generates a difference in thermal emitted radiation at the detector means when the temperature of the first and second tires differ from one another. The detector means may comprise a differential thermal emitted radiation detector.

The switching means may comprise a shutter operable between first and second positions corresponding to allowing respective first and second fields of view to be detected. The shutter includes an opaque panel pivotally disposed between the detector and the optics, a spring biasing the panel to the first position and an electromagnet for attracting the panel to second position.

The means for defining first and second fields of view may comprise optics having first and second optical elements, e.g., Fresnel lenses, or optics having a single optical element capable of movement between a first position and a second position corresponding to respective first and second fields of view. In the latter case, the switching means may comprise a vibrator for effecting movement of the optics between first and second positions corresponding to allowing respective first and second fields of view to be detected.

A method for monitoring tires mounted to a vehicle in accordance with the invention comprises the steps of detecting the temperature of the tires from locations external of and apart from the tires, determining whether a difference in temperature is present between associated mated pairs of the tires, and responding to the determined difference in thermal radiation between mated pairs of the tires. The temperature of the tires may be detected by at least one thermal radiation detecting device and/or transmitted from the locations external of and apart from the tires to a processor remote from the transmitters. The difference in temperature between associated mated pairs of tires is thus determined in the processor. To detect the temperature of the tires, infrared radiation receivers may be arranged on the vehicle so that each has a clear field of view of at least one of the tires. The receivers could thus be mounted in tire wells around each of the tires. The response to the determined difference in temperature may be provided only if the difference is above the predetermined threshold.

Power is preferably supplied to the thermal radiation detecting devices wirelessly, although a battery may also be wired in circuit with the thermal radiation detecting devices for backup or a direct wire connection to the vehicle power system can be used. Inductively powering the thermal radiation detecting devices entails using an inductive power arrangement such as a pair of looped wires arranged in the vehicle and passing proximate the thermal radiation detecting devices. The thermal radiation detecting devices are coupled to circuitry capable of receiving power inductively from the pair of looped wires. Powering the thermal radiation detecting devices through radio frequency energy transfer entails arranging a radio frequency energy transfer device in connection with the thermal radiation detecting device. This energy transfer device would be similar to circuitry in RIFD tags.

The invention is also concerned with wireless devices that contain transducers. An example is a temperature transducer coupled with appropriate circuitry which is capable of receiving power either inductively or through radio frequency energy transfer or even, and some cases, capacitively. Such temperature sensors may be used to measure the temperature inside the passenger compartment or outside of the vehicle. It also can be used to measure the temperature of some component in the vehicle, e.g., the tire. The distinctive feature of this invention is that such temperature transducers are not hard wired into the vehicle and do not rely solely on batteries. Such temperature sensors have been used in other environments such as the monitoring of the temperature of domestic and farm animals for health monitoring purposes.

Upon receiving power inductively or through the radio frequency energy transfer, the temperature transducer conducts its temperature measurement and transmits the detected temperature to a process or central control module in the vehicle.

The wireless communication within a vehicle can be accomplished in several ways. The communication can be through the same path that supplies power to the device, or it can involve the transmission of waves that are received by another device in the vehicle. These waves can be either electromagnetic (microwave, infrared, etc) or ultrasonic.

Many other types of transducers or sensors can be used in this manner. The distance to an object a vehicle can be measured using a radar reflector type RFID (Radio Frequency Identification) tag which permits the distance to the tag to be determined by the time of flight of radio waves. Another method of determining distance to an object can be through the use of ultrasound wherein the device is commanded to emit an ultrasonic burst and the time required for the waves to travel to a receiver is an indication of the displacement of the device from the receiver.

Although in most cases the communication will take place within the vehicle, and some cases such as external temperature transducers or tire pressure transducers, the source of transmission will be located outside of the compartment of the vehicle.

A discussion of RFID technology including its use for distance measurement is included in the *RFID Handbook*, by Klaus Finkenzeller, John Wiley & Sons, New York 1999, which is included herein by reference in its entirety.

In its simplest form the invention can involve a single transducer and system for providing power and receiving information. An example of such a device would be an exterior temperature monitor which is placed outside of the vehicle and receives its power and transmits its information through the windshield glass. At the other extreme, a pair of parallel wires carrying high frequency alternating current can travel to all parts of the vehicle where electric power is needed. In this case every device could be located within a few inches of this wire pair and through an appropriately designed inductive pickup system, each device receives the power for operation inductively from the wire pair. A system of this type which is designed for use in powering vehicles is described in several U.S. patents listed above.

In this case, all sensors and actuators on the vehicle could be powered by the inductive power transfer system. The communication with these devices could either be over the same system or, alternately, could be take place via RF or other similar communication system. If the communication takes place either by RF or over a modulated wire system, a protocol such as the Bluetooth protocol can be used. Other options include the Ethernet and token ring protocols.

The above system technology is frequently referred to as loosely coupled inductive systems. Such systems have heretofore been used for powering a vehicle down a track or roadway but have not been used within the vehicle. The loosely coupled inductive system makes use of high frequency (typically 10,000 Hz) and resonant circuits to achieve a power transfer approaching 99 percent efficiency. The resonant system is driven using a switching amplifier. As discussed herein, this would be the first example of a high frequency power system for use within vehicles.

Every device that utilizes the loosely coupled inductive system would contain a microprocessor and thus would considered a smart device. This includes every light, switch, motor, transducer, sensor etc. Each device would thus have an address and would respond only to information containing its address.

It is now contemplated that the power systems for next generation automobiles and trucks will change from the current standard of 12 volts to a new standard of 42 volts. The power generator or alternator in such vehicles will produce alternating current and thus will be compatible with the system described herein wherein all power within the vehicle will be transmitted using AC.

It is contemplated that some devices will require more power than can be obtained instantaneously from the inductive, capacitive or radio frequency source. In such cases, batteries, capacitors or ultra-capacitors may be used directly associated with a particular device to handle peak power requirements. Such a system can also be used when the device is safety critical and there is a danger of disruption of the power supply during a vehicle crash, for example. In general the battery or capacitor would be charged when the device is not being powered.

In some cases, the sensing device may be purely passive and require no power. One such example is when an infrared or optical beam of energy is reflected off of a passive reflector to determine the distance to that reflector. Another example is a passive reflective RFID tag.

As noted above, several U.S. patents describe arrangements for monitoring the pressure inside a rotating tire and to transmit this information to a display inside the vehicle. A preferred approach for monitoring the pressure within a tire is to instead monitor the temperature of the tire using a temperature sensor and associated power supplying circuitry as discussed above and to compare that temperature to the temperature of other tires on the vehicle, as discussed above. When the pressure within a tire decreases, this generally results in the tire temperature rising if the vehicle load is being carried by that tire. In the case where two tires are operating together at the same location such as on a truck trailer, just the opposite occurs. That is, the temperature of the fully inflated tire increases since it is now caring more load than the partially inflated tire.

BRIEF DESCRIPTION OF THE DRAWINGS

The present invention will be further understood from the following description with reference to the drawings in which.

DETAILED DESCRIPTION OF THE PREFERRED EMBODIMENTS

Figure 1:
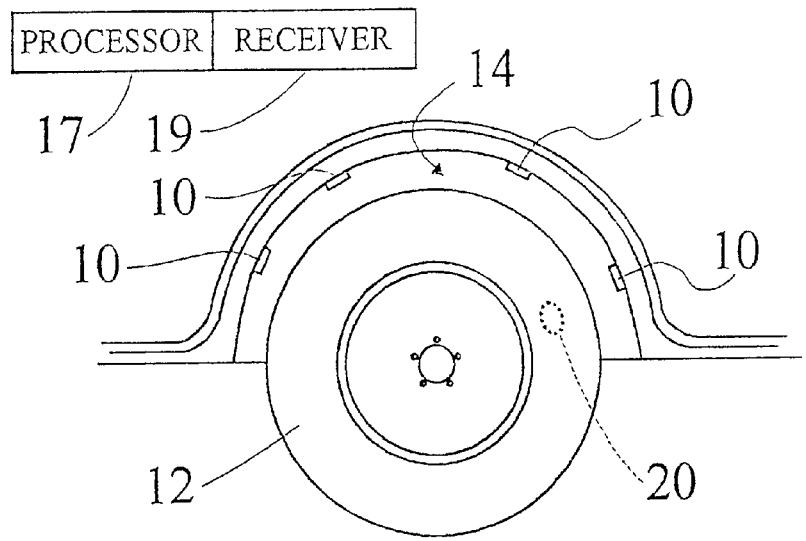
FIG. 1 shows an arrangement for measuring tire temperature in accordance with a preferred embodiment of the present invention.

Referring to the accompanying drawings wherein like reference numerals designate the same or similar elements, FIG. 1 illustrates a tire temperature sensor in accordance with an embodiment of the present invention. The tire temperature sensor 10 is mounted on the vehicle in a position to receive thermal radiation from the tire 12, e.g., situated in a tire well 14 of the vehicle. Each tire well of the vehicle can include one or more temperature sensors 10. If more than one tire is present in a well, e.g., on trucks, then the placement of a plurality of sensors would be advantageous for the reasons discussed below.

Figure 1A:
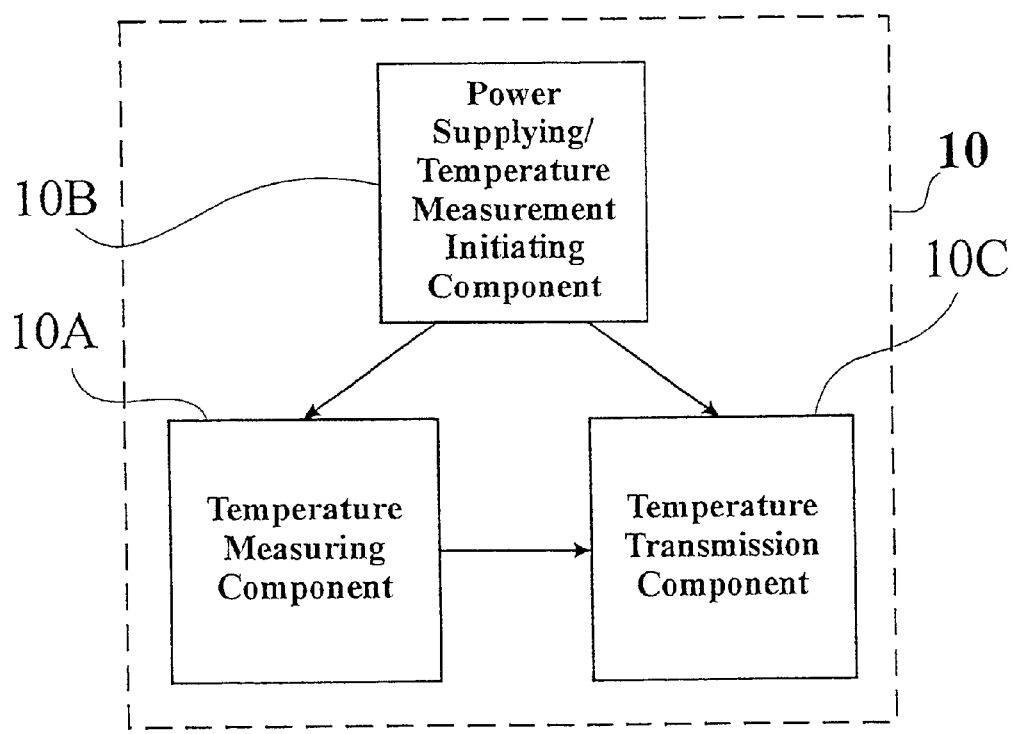
FIG. 1A schematically illustrates the elements of a tire temperature sensor in accordance with the invention.

As shown in FIG. 1A, temperature sensor 10 includes a temperature measuring component 10A, a power supplying/temperature measurement initiating component 10B coupled to the temperature measuring component 10A and a temperature transmission component 10C also coupled to the temperature measuring component 10A.

Temperature measuring component 10A may be a transducer capable of measuring temperature within about 0.25 degrees (Centigrade). This becomes a very sensitive measure, therefore, of the temperature of the tire if the measuring component 10A is placed where it has a clear view of the tire tread or sidewall, i.e., the tire is in the field of view of the measuring component 10A. The status of a tire, e.g., whether it is worn and needs to be replaced, damaged or operating normally, can then be determined in a processor or central control module 17 by comparing it to one or more mating tires on the vehicle. In the case of a truck trailer, the mating tire would typically be the adjacent tire on the same axle. In an automobile, the mating tire would be the other tire at the front or back of the vehicle. Thus, for a sport utility vehicle (SUV), the temperature of the two rear tires of the SUV can be compared and if one is hotter than the other than it can be assumed that if this temperature differential persists that the hotter tire is under-inflated, delaminating or otherwise defective.

Temperature measuring component 10A will usually require power to enable it to function. Power is therefore supplied by the power supplying/temperature measurement initiating component 10B which may be in the form of appropriate circuitry. When inductively powering sensor 10, power supplying component 10B is located proximate the pair of parallel wires 15 carrying high frequency alternating current through the vehicle and is designed to receive power inductively from the pair of wires 15. Communication with sensor 10 could be over the same pair of parallel wires, i.e., a single bus on the vehicle provides both communications and power, and sensor 10 would have a dedicated address to enable communication only with sensor 10 when desired. See for example U.S. patent application Ser. No. 09/356,314 which is incorporated herein by reference. Power supplying component 10B could also be designed to be activated upon the transmission of radio frequency energy of a specific frequency. Thus, when such radio frequency energy is transmitted, power supplying component 10B is activated and provides sufficient power to the temperature measuring component 10B to conduct a measurement of the temperature of the tire and enable the transmission of the detected temperature to a processor or central control module of the vehicle via temperature transmission component 10C.

Power supplying component 10B could also be integrated with a battery in the event that the circuitry for receiving power inductively or through radio frequency energy is inoperable.

An electric circuit for inductively receiving power and an electric circuit for supplying power upon being activated upon transmission of a certain radio frequency are well-known in the art and can be any of those in the prior art or any improvements thereto. Also, the power supplying component 10B can be any component which is designed to receive power (electricity) wirelessly or receive an activation signal wirelessly or by wire.

The processor 17 is mounted in the vehicle and includes any necessary circuitry and components to perform the reception function, i.e., the reception of the transmitted temperature from the temperature transmission component 10C of each sensor 10, and the comparison function, i.e., to compare mated tires, or to compare the temperature of the tire to a threshold. The reception function may be performed by a receiver 19 mounted in connection with the processor 17.

The threshold to which the temperature of the tire is compared may be a predetermined threshold value for the specific tire, or it may be variable depending on the vehicle on which the tire is mounted. For example, it may depend on the weight of the vehicle, either in its unloaded state or in its loaded state. It could also vary on the driving conditions, weather conditions or a combination of the previously mentioned factors.

Upon the processor 17 making such a determination based on the comparison of the data obtained from two tire temperature sensors, it can activate or direct the activation of response means to alert the driver by displaying a warning light, sound an audible alarm or activate another type of alarm or warning system. A display can also be provided to display, e.g., to the vehicle occupant, an indication or representation of the determination by the processor. In general, such an display, alarm or warning device will be considered response means. Another response means may be a telecommunications unit which is operative to modify a vehicle service facility of the need to inflate one or more of the tires, or repair or replace one or more of the tires. In this regard, the invention can be integrated or incorporated into a remote vehicle diagnostic system as disclosed in U.S. Pat. No. 5,684,701 to the current assignee herein.

The tire temperature sensor 10 can also be used to warn of a potential delamination, as have occurred on many tires manufactured by Firestone. Long before the delamination causes a catastrophic tire failure, the tire begins to heat and this differential temperature can be measured by the tire temperature sensor 10 and used to warn the driver of a pending problem. Similarly, the delamination that frequently accompanies retreaded tires on large trucks even when they are properly inflated can be predicted if the temperature of the tread of the vehicle is monitored One disadvantage of an external temperature measuring system is that it can be prone to being occluded by snow, ice, and dirt. This problem is particularly troublesome when a single external sensor is used but would be alleviated if multiple external sensors are used such as shown in FIG. 1. An alternate approach is to place a temperature sensor within the vehicle tire as with the pressure sensor, as described in some of the prior art U.S. patents mentioned above. The resulting temperature measurement data can be then transmitted to the vehicle either inductively or by radio frequency, or other similar suitable method.

In accordance with the invention, it is therefore possible to use both types of sensors, i.e., an externally mounted sensor (external to the tire) and an internally mounted tire, i.e., a sensor mounted in connection with the tire. FIG. 1 thus shows a sensor 20 is placed within the tire 12 for those situations in which it is desirable to actually measure the pressure or temperature within a tire (or for when the external sensor 10 is occluded). Sensor 20 can be designed to measure the temperature of the air within the tire, the temperature of the tire tread and/or the pressure of the air in the tire. Sensor 20 can be any of those described in the U.S. patents mentioned above.

Preferably, sensor 20 receives its operational power either inductively or through radio frequency. Heretofore, inductively powered tire mounted sensors have taken place at very low frequencies, e.g., about 100 Hz, and no attempt has been made to specifically design the inductive pickup so that the efficiency of power transfer is high. In contrast, the present invention operates at much higher frequencies, in some cases as high as 10 kHz or higher, and approaches 99 percent efficiency. Additionally, many systems have attempted to transmit tire pressure to the vehicle cab wirelessly with poor results due to the intervening metal surfaces of the vehicle. The preferred approach in the present invention is to transmit the information over the inductive power source wires.

Many transducers are available for monitoring pressure within a vehicle tire. Some transducers are based on measuring the pressure across the valve stem. Others use a calibrated pressurized chamber and measure the displacement of one surface of that container relative to another. This displacement can be measured by a variety of techniques including capacitance. Any of these systems can be used with the present invention.

Figure 2A:
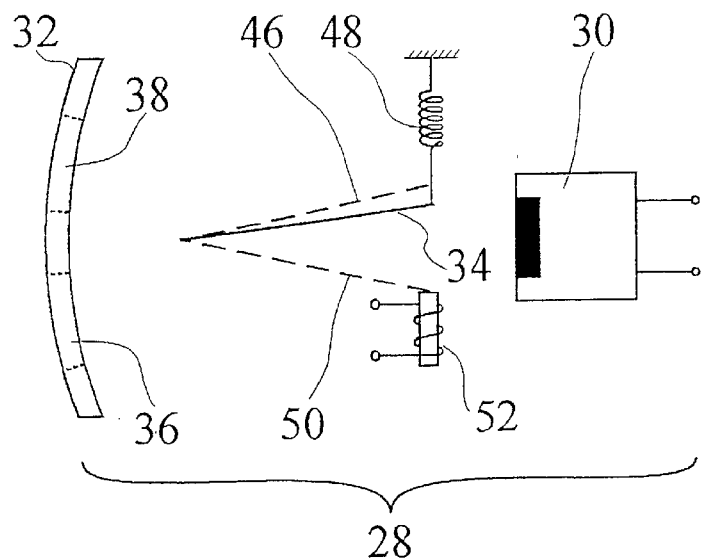
FIG. 2A shows a thermal emitted radiation detecting device in accordance with a preferred embodiment of the invention.
Figure 2B:
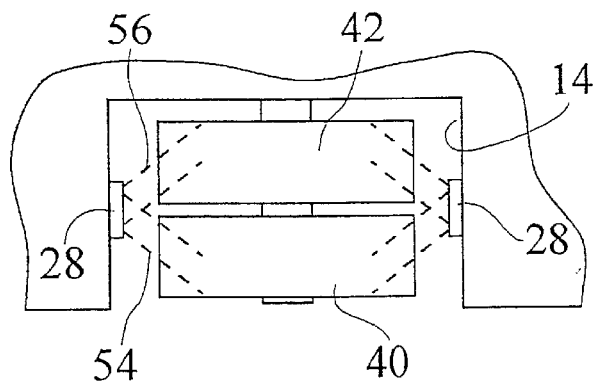
FIG. 2B is a cross-sectional, partial view of a tire well of a truck trailer showing the placement of the thermal emitted radiation detecting device shown in FIG. 2A.

FIGS. 2A and 2B show an embodiment for detecting a difference in temperature between two tires situated alongside one another, e.g., on a truck trailer. A difference in temperature between two tires operating alongside one another may be indicative of a pressure loss in one tire since if the tires are not inflated to the same pressure, the tire at the higher pressure will invariably carry more load than the underinflated tire and therefore the tire at the higher pressure will be higher than the temperature of the underinflated tire. It can also predict if one tire is delaminating.

In this embodiment, the tire temperature/pressure measuring system 28 includes a thermal emitted radiation detector 30, a Fresnel lens 32 in spaced relationship from the thermal emitted radiation detector 30 and a shutter 34 disposed between the thermal emitted radiation detector 30 and the Fresnel lens 32. The Fresnel lens 32 includes lens elements equal in number to the number of tires 40,42 situated alongside one another, two in the illustrated embodiment (lens elements 36,38). Each lens elements 36 and 38 defines a field of view for the detector 30 corresponding to the associated tire 40,42. The shutter 34 is operated between a first position 46 and is biased toward that position by a return spring 48 and a second position 50 and is attracted toward that second position by an electromagnet 52. In the first position 46, the shutter 34 blocks the field of view from the lens element 38 corresponding to tire 42 and allows the field of view from the lens element 36 corresponding to the tire 40. In the second position 50, on energizing electromagnet 52, the shutter 34 blocks the field of view from the lens element 36 and allows the fields of view from lens element 38. As the detector 30 is sensitive to changes in temperature, the switching between fields of view from one tire to the other tire will provide a difference if the temperature of one tire differs from the temperature of the other.

Referring to FIG. 2B, the detector 30 establishes fields of view 54 and 56 generally directed toward the tires 40,42, respectively. The fields of view 54 and 56 correspond to the Fresnel lens elements 36 and 38, respectively. The thermal emitted radiation detector 30, for the 8–14 micron range, may be a single element pyroelectric detector such as the Hamamatsu P4736. As an alternative a pyroelectric detector having two sensing elements, for example, a Hynman LAH958 may be used with one of the detecting elements covered. Alternatively, a semicustom device could be used. Such devices are usually manufactured with a large resistor, e.g. 100 GOhm, in parallel to the detecting elements. A lower value of this resistor provides a wider effective bandwidth with a tradeoff of less sensitivity at lower frequencies. If a lower frequency cutoff of about 10 Hz is desired, a resistor value of about 100 MOhm would be appropriate. These types of pyroelectric detectors are sensitive to changes in temperature and not to absolute temperature thus the detector must see a change in temperature in order to generate an output signal. This change in temperature will occur when one tire is at a higher or lower pressure than the adjacent tire indicating underinflation of one of the tires or is delaminating. The measurement of the change in temperature between the tires is accomplished by a shutter mechanism as described above. The shutter could be driven at a constant rate of 10 Hz. The rate of operation must be slow enough to come within the band pass of the pyroelectric detector used.

Figure 3:
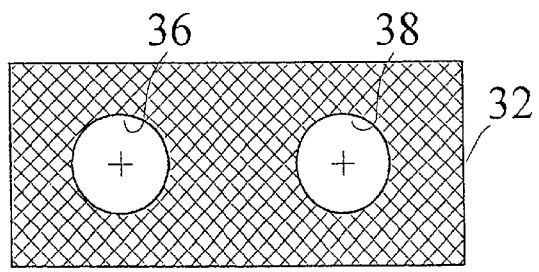
FIG. 3 schematically shows a compound Fresnel lens used in the thermal emitted radiation detecting device of FIG. 2A.

FIG. 3 illustrates a Fresnel lens 32 in accordance with one embodiment of the present invention. The Fresnel lens 32 includes lens elements 36 and 38 which are aligned with the tires 40,42. The lens elements 36 and 38 are offset from each other to provide different fields of view, as illustrated in FIG. 2B. The Fresnel lens 32 also includes a thermal emitted radiation opaque mask 58 around the lens areas. The lens elements 36 and 38 are dimensioned to ensure that the thermal emitted radiation collected by the lens elements 36,38 when the pressure of the tires is substantially the same will be the same, i.e., no temperature difference will be detected.

Figure 4:
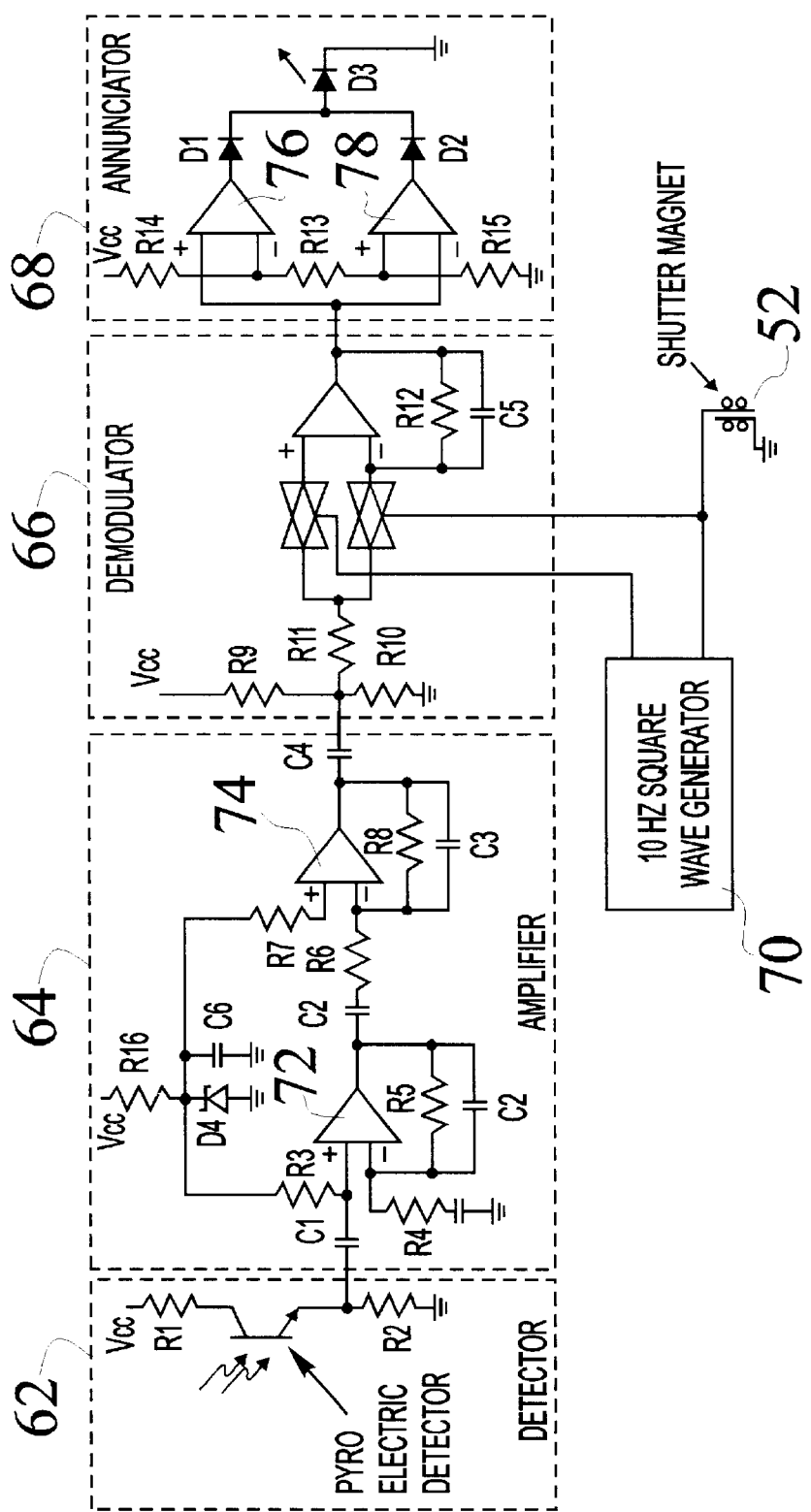
FIG. 4 schematically illustrates a circuit for deriving an indication of a temperature imbalance between two tires using tire temperature sensor of FIGS. 2A and 2B.

Referring to FIG. 4, a circuit for driving the shutter mechanism and for driving from the detector to provide an indication of a temperature difference between a mated pair of tires situated alongside one another is shown. In this non-limiting embodiment, the circuit includes a detector circuit 62 providing input to an amplifier circuit 64 which provides input to a demodulator circuit 66 which provides input to an annunciator circuit 68. The demodulator circuit 66 is driven by a 10 Hz square wave generator 70 which also drives the shutter electromagnet 52. The detector circuit 62 includes the pyroelectric detector 30. Output from the detector 30 is capacitively coupled via capacitor C1 to the amplifier circuit 62 provided with two amplification stages 72 and 74. The amplifier circuit 64 acts as a high pass filter with a cut off frequency of about 10 Hz. The output of the amplifier circuit 64 is applied as input to the demodulator circuit 66. The demodulator circuit 66 is operated at a frequency of 10 Hz by applying the output of the 10 Hz square wave generator 70 to switches within the modulator circuit. The annunciator circuit 68 has comparators 76 and 78 which compare the output of the demodulator circuit 66 to threshold values to determine a temperature difference between the mated tires above a threshold value and in response, e.g., provides an output indication in the form of a drive signal to an LED D3.

Figure 5:
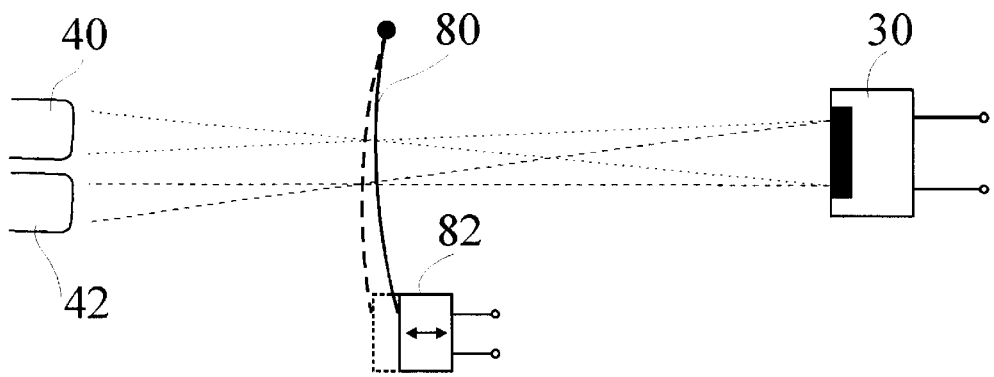
FIG. 5 illustrates another embodiment of the thermal emitted radiation detector for use in the method and apparatus in accordance with the invention.
Figure 6:
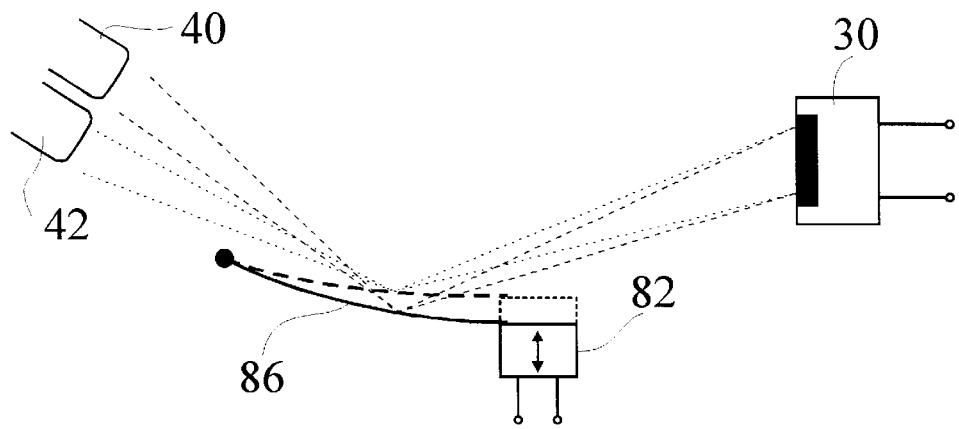
FIG. 6 illustrates another embodiment of the thermal emitted radiation detector for use in the method and apparatus in accordance with the invention.
Figure 7:
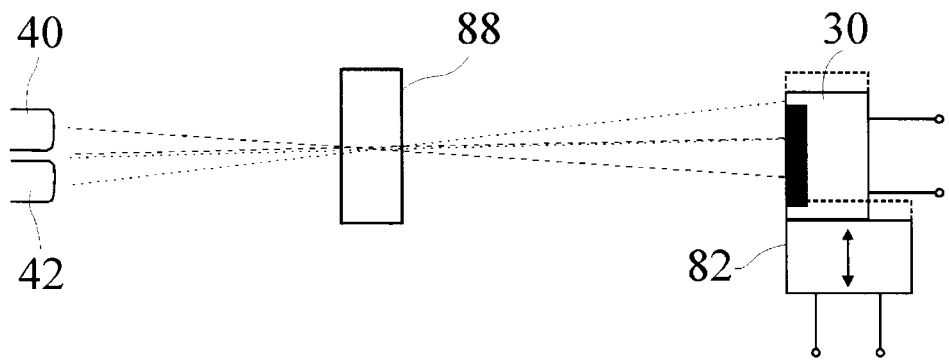
FIG. 7 illustrates another embodiment of the thermal emitted radiation detector for use in the method and apparatus in accordance with the invention.

FIGS. 5, 6 and 7 illustrate alternative embodiments of the thermal emitted radiation detector 28. In the preferred embodiment of FIGS. 2A and 2B, the reference fields of view of the tires 40,42 are defined by Fresnel lens elements 36 and 38, respectively, with selection of the field of view being determined by the shutter 34. It is possible to provide various mechanical shutter arrangements for example vibrating reeds or rotating blades. A LCD used as a shutter may work with thermal emitted radiation. It is also possible to change the field of view of the detector 30 by other means as described below.

Referring to FIG. 5, a single Fresnel lens 80 is provided and supported at one side by a vibrating device 82. The vibrating device 82 may be electromechanical or piezoelectric in nature. On application of the drive signal to the vibrating device 82, the Fresnel lens 80 is rocked between two positions, corresponding to a field of view of tire 40 and a field of view of tire 42. As the detector 30 is sensitive to change in temperature, the change in fields of view results in an output signal being generated when there is a difference in temperature between tires 40 and 42. Operation of the rest of the detector is as described with regard to the preferred embodiment. As is well known the optical elements lenses and the optical elements mirrors may be interchanged. The Fresnel lens of FIG. 5 may thus be replaced by a concave mirror.

FIG. 6 illustrates such an arrangement in another embodiment of the invention. In this embodiment, the Fresnel lens 80, of FIG. 5, is replaced by a concave mirror 86. The mirror 86 is mounted in a similar manner to the Fresnel lens, and in operation vibrates between two fields of view.

The embodiment of FIG. 7 uses fixed optics 88, i.e., a lens or a mirror, but imparts relative movement to the detector to define two fields of view. While the embodiments of FIGS. 5–7 have been described using the square wave generator of the preferred embodiment of FIGS. 2A and 2B, other waveforms are possible. The embodiments of FIGS. 5–7 define fields of view based on relative position and would capable of continuous movement between positions if the detector has sufficient bandwidth. For example, either an MCT (HgCdTe) detector or a pyro-electric with a relatively low parallel resistor (about 1 MOhm) would have sufficient bandwidth. Hence, a saw-tooth waveform could be used to drive the vibration device 82 to cause the field of view to sweep an area covering both tires 40,42.

Instead of using the devices shown in FIGS. 2A, 2B and 5–7 for determining a temperature difference between mated tires, it is possible to substitute a heat generating element for one of the tires whereby the heat generating element is heated to a predetermined temperature which should equal the temperature of a normally operating tire, or possibly the temperature of a tire in the same driving conditions, weather conditions, vehicle loading conditions, etc. (i.e., the temperature can be varied depending on the instantaneous use of the tire). Thus, the field of view would be of a single tire and the heat generating element. Any difference between the temperature of the heat generating element and the tire in excess of a predetermined amount would be indicative of, e.g., an under-inflated tire or an overloaded tire.

Figure 8:
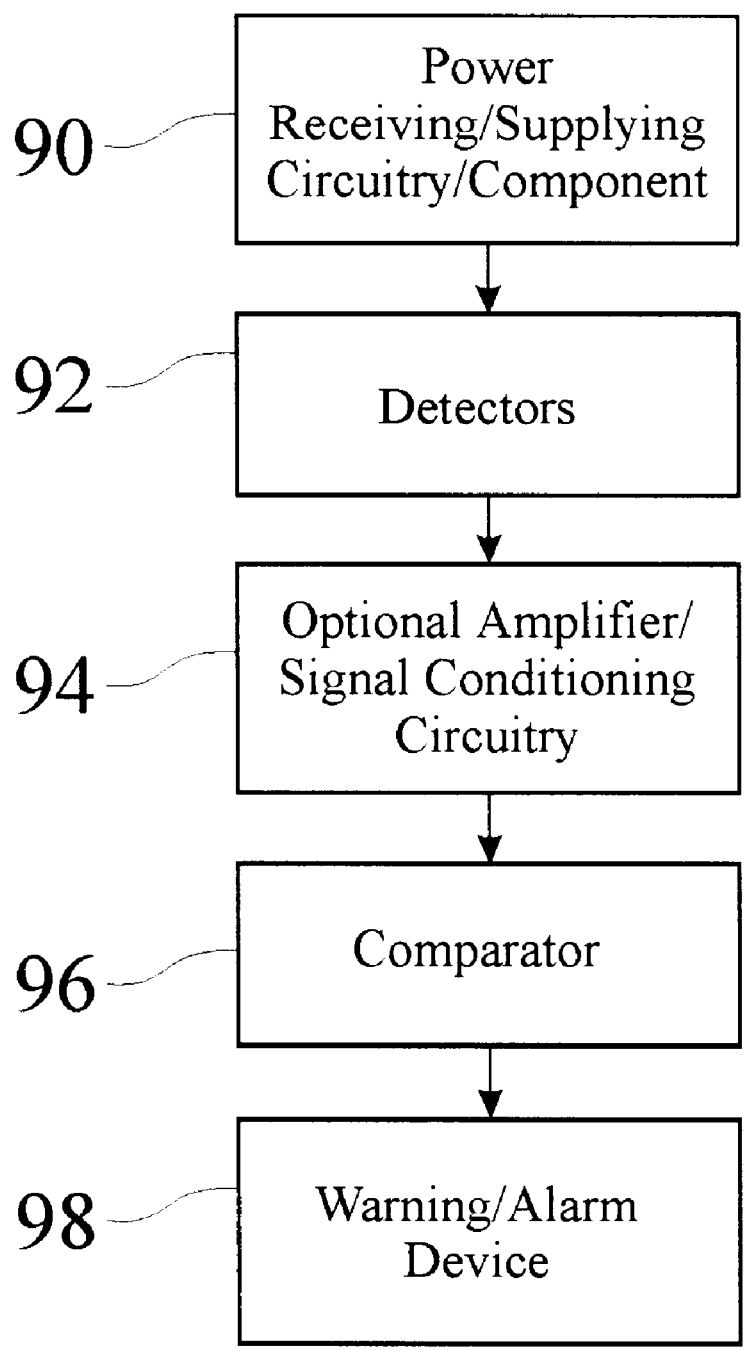
FIG. 8 is a schematic illustration showing a basic apparatus for monitoring tires in accordance with the invention.

FIG. 8 shows a schematic illustration of the system in accordance with the invention. Power receiving/supplying circuitry/component 90 is that portion of the arrangement which supplies electricity to the thermal radiation detectors 92, e.g., the appropriate circuitry for wired power connection, inductive reception of power or radio frequency energy transfer. Detectors 92 are the temperature sensors which measure, e.g., the temperature of the tire tread or sidewall. For example, detector 92 may be the thermal emitted radiation detecting device described with reference to FIGS. 1, 2A and 2B. Amplifiers and/or signal conditioning circuitry 94 are preferably provided to condition the signals provided by the detectors 92 indicative of the measured temperature. The signals are then forwarded to a comparator 96 for a comparison in order to determine whether the temperature of the tire treads for mating tires differs by a predetermined amount. Comparator 96 may be resident or part of a microprocessor or other type of automated processing device. The temperature difference which would be indicative of a problem with one of the tires is obtained through analysis and investigation prior to manufacturing of the system and construction of the system. Comparator 96 provides a signal if the difference is equal to or above the predetermined amount. A warning/alarm device 98 is coupled to the comparator and acts upon the signal provided by the comparator 96 indicative of a temperature difference between the mating tires which is greater than or equal to the predetermined amount. The amplifiers and signal conditioning circuitry 94 may be associated with the detectors 92, i.e., at the same location, or associated with the processor within which the comparator 96 is resident.

Figure 9:
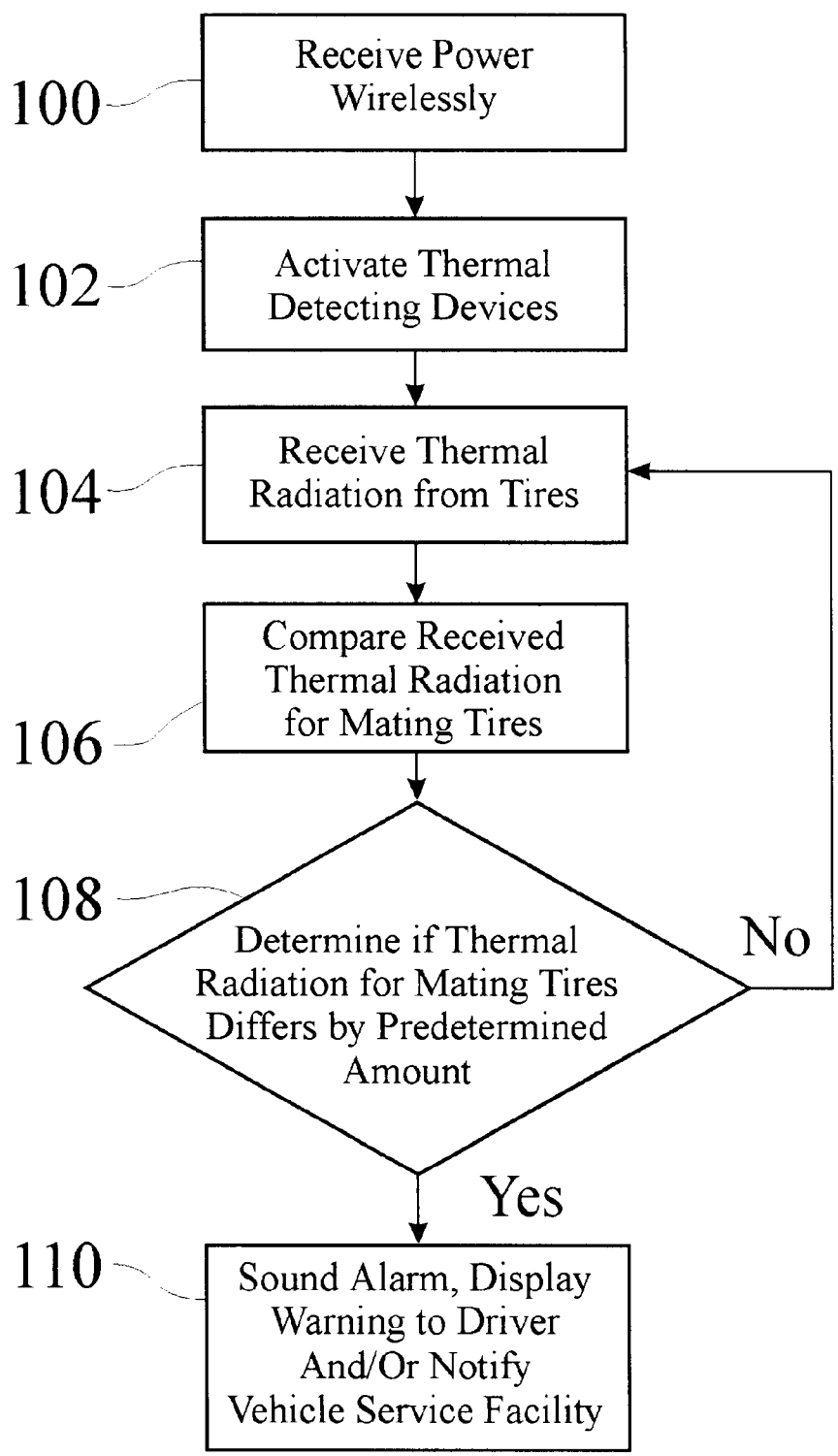
FIG. 9 is a schematic illustration showing one basic method for monitoring tires in accordance with the invention.

FIG. 9 shows a schematic illustration of the process for monitoring tire pressure in accordance with the invention. At 100, power is provided wirelessly to a power supplying component associated with the thermal radiation detecting devices. At 102, the thermal detecting devices are activated upon the reception of power by the power supplying component. At 104, the thermal radiation from the tires is detected at a location external of and apart from the tires. The thermal radiation for mating tires is compared at 106 and a determination made if the thermal radiation for mating tires differs by a predetermined amount at 108. If so, an alarm will sound, a warning will be displayed to the driver and/or a vehicle service facility will be notified at 110. If not, the process will continue with additional detections of thermal radiation from the tire(s) and comparisons.

Figure 10:
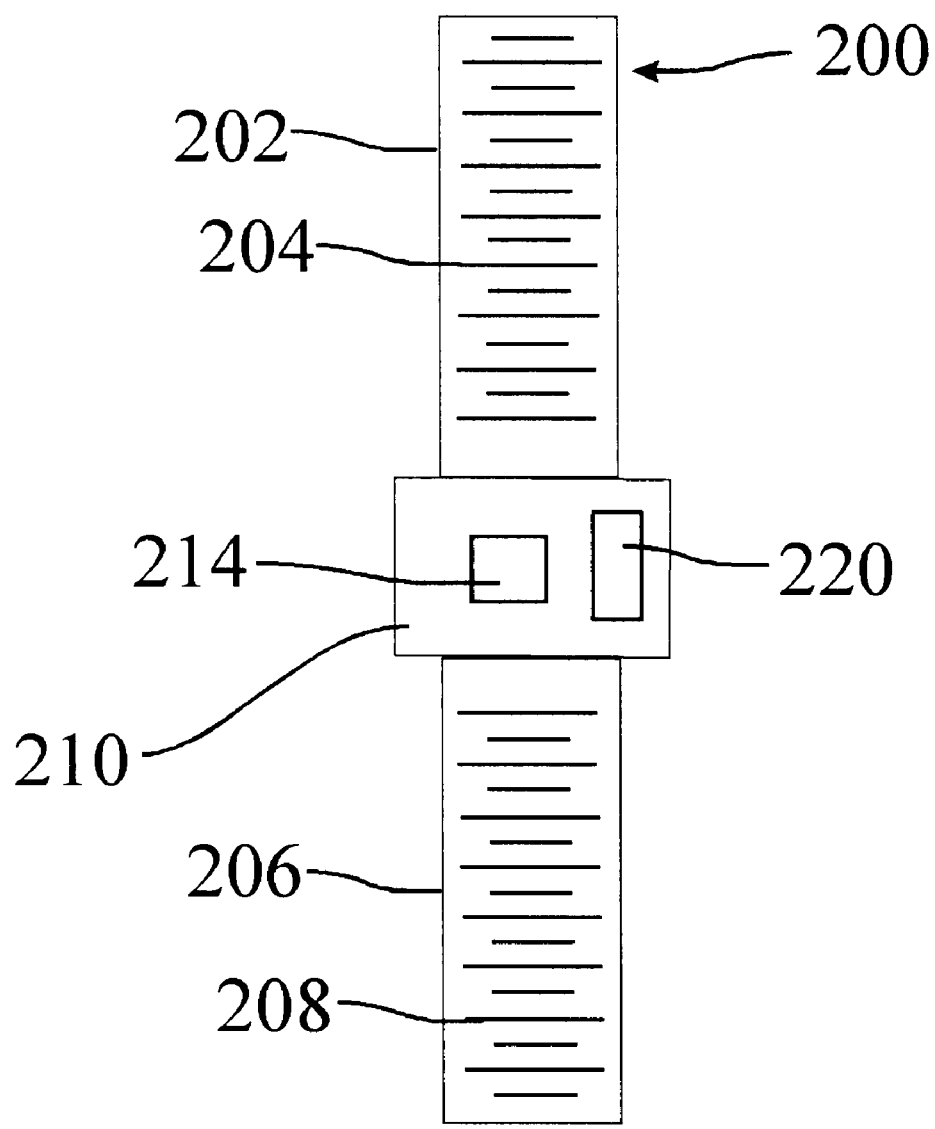
FIG. 10 illustrates a strain gage on a bolt weight sensor.

In FIG. 10, a bolt 200 is used to attract a vehicle seat to a support structure such as a slide mechanism as illustrated in FIGS. 21 and 22, among others, of co-pending U.S. patent application Ser. No. 09/193,209 filed Nov. 17, 1998 which is included herein by reference. The bolt 200 is attached to the seat or seat structure (not shown) by inserting threaded section 202 containing threads 204 and then attaching a nut (not shown) to secure the bolt 200 to the seat or seat structure. Similarly, the lower section of the bolt 200 is secured to the slide mechanism (not shown) by lower bolt portion 206 by means of a nut (not shown) engaging threads 208. Four such bolts typically used to attach the seat to the vehicle.

As the weight in the seat increases, the load is transferred to the vehicle floor by means of stresses in bolt 200. Note that the stress in the bolt section 210 is not affect by stresses in the bolt sections 202 and 206 caused by the engagement of the nuts that attach the bolt to the seat and vehicle respectively.

The silicon strain gage 214 is attached, structured and arranged to measure the strain in bolt section 210 caused by loading from the seat and its contents. Silicon strain gage 214 was chosen for its high gage factor and low power requirements relative to other strain gage technologies. Associated electronics 220 is typically incorporated into a single chip and may contain connection means for wires, not shown, or radio frequency circuits and an antenna for radio frequency transfer of power and signals from the strain gage 214 to an interrogator mounted on the vehicle, not shown. In this manner, the interrogator supplies power and receives the instantaneous strain value that is in the strain gage 214.

Although a single strain element has been illustrated, the bolt 200 may contain 1, 2, or even as many as 4 such strain gage assemblies on various sides of bolt section 210.

Figure 11:
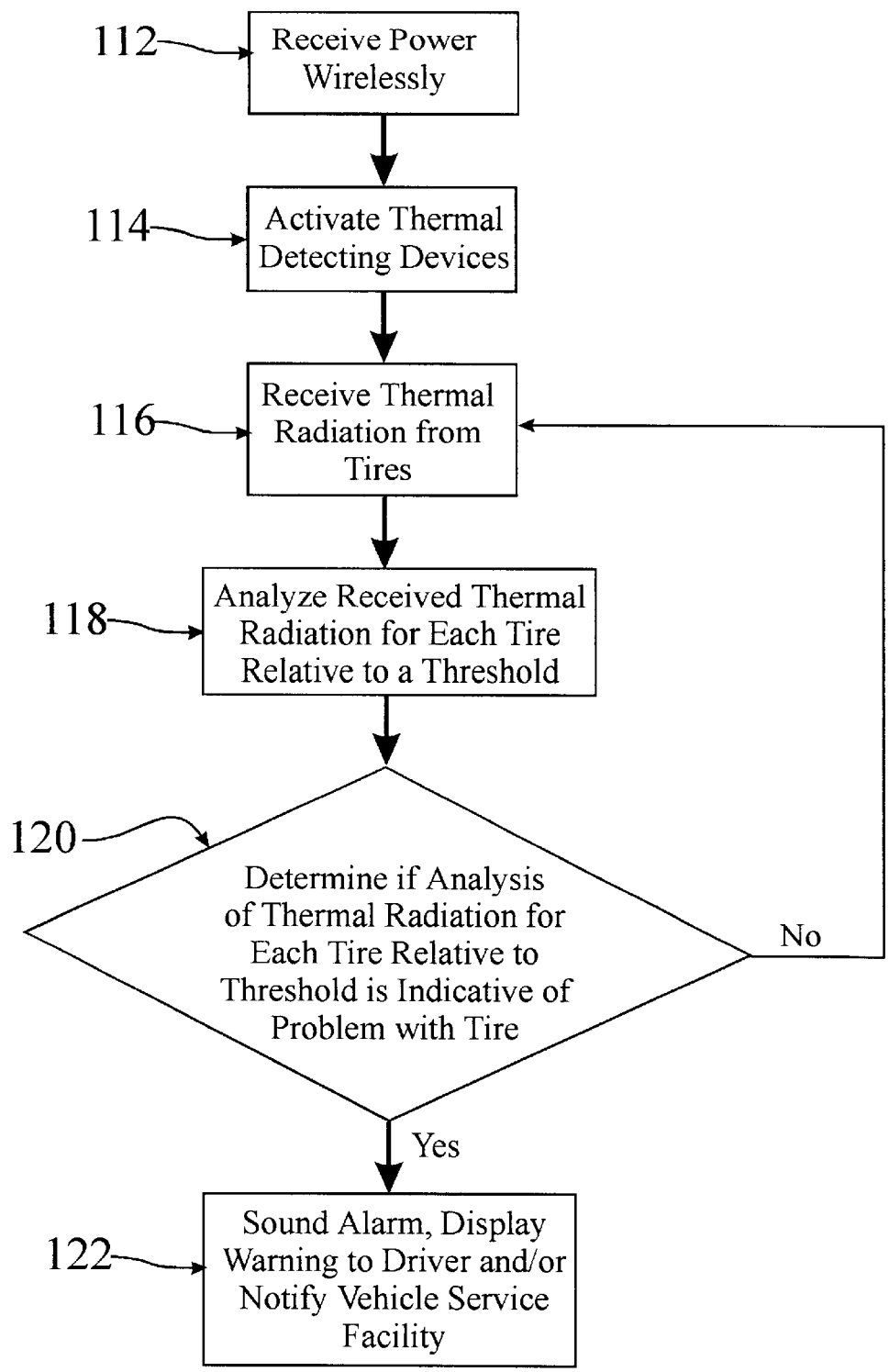
FIG. 11 is a schematic illustration showing another basic method for monitoring tires in accordance with the invention.

Instead of designating mating tires and performed a comparison between the mated tires, the invention also encompasses determining the absolute temperature of the tires and analyzing the determined absolute temperatures relative to a fixed or variable threshold. This embodiment is shown schematically in FIG. 11. At 112, power is provided wirelessly to a power supplying component associated with the thermal radiation detecting devices. At 114, the thermal detecting devices are activated upon the reception of power by the power supplying component. At 116, the thermal radiation from the tires is detected at a location external of and apart from the tires. The thermal radiation for each tire is analyzed relative to a threshold at 118 and a determination is made based on the analysis of the thermal radiation for each tire relative to the threshold at 120 as to whether the tire is experiencing a problem or is about to experience a problem, e.g., delaminating, running out of air, etc. The analysis may entail a comparison of the temperature, or a representation thereof, to the threshold, e.g., whether the temperature differs from the threshold by a predetermined amount. If so, an alarm will sound, a warning will be displayed to the driver and/or a vehicle service facility will be notified at 122. If not, the process will continue with additional detections of thermal radiation from the tire(s) and analysis.

As noted above, the analysis may be a simple comparison of the determined absolute temperatures to the threshold. In this case, the thermal radiation detecting means, e.g., infrared radiation receivers, are also arranged external of and apart from the tires for detecting the temperature of the tires and processor means are coupled to the thermal radiation detecting means for receiving the detected temperature of the tires and analyze the detected temperature of the tires relative to a threshold. The infrared radiation receivers may be arranged in any location which affords a view of the tires. Response means are coupled to the processor means and respond to the analysis of the detected temperature of the tires relative to the threshold. The response means may comprise an alarm for emitting noise into the passenger compartment, a display for displaying an indication or representation of the detected temperature or analysis thereof, a warning light for emitting light into the passenger compartment from a specific location and/or a telecommunications unit for sending a signal to a remote vehicle service facility.

The thermal radiation detecting means may be provided with power and information in any of the ways discussed above, e.g., via power receiving means which receive power wirelessly (inductively, through radio frequency energy transfer techniques and/or capacitively) and supply power to the thermal radiation detecting means. Further, coupling means couple the thermal radiation detecting means to the processor means. This may comprise a transmitter mounted in connection with the thermal radiation detecting device and a receiver mounted in connection with or integrated into the processor means such that the detected temperature of the tires is transmitted wirelessly from said thermal radiation detecting means to said processor means.

In a similar manner, a method for monitoring tires mounted to a vehicle comprises the steps of detecting the temperature of the tires from locations external of and apart from the tires, analyzing the detected temperature of the tires relative to a threshold, and responding to the analysis of the detected temperature of the tires relative to the threshold. The temperature of the tires is detected by one or more thermal radiation detecting device and power may be supplied wirelessly to the thermal radiation detecting device(s), e.g., inductively, through radio frequency energy transfer, capacitively.

The threshold may be a set temperature or a value relating to a set temperature. Also, the threshold may be fixed or variable based on for example, the environment in which the tires are situated, the vehicle on which the tire is situated, and the load of the vehicle on the tires. As noted above, the thermal radiation detecting devices may be wirelessly coupled to the processor central control module of the vehicle and adapted to receive power inductively, capacitively or through radio frequency energy transfer. Other components of the vehicle can also be wirelessly coupled to the processor or central control module for the purposes of data transmission and/or power transmission. A discussion of some components follows.

Seat Systems

In more enhanced applications, it is envisioned that components of the seat will be integrated into the power transmission and communication system. In many luxury cars the seat subsystem is becoming very complicated. Seat manufacturers state that almost all warranty repairs are associated with the wiring and connectors associated with the seat. The reliability of seat systems can therefore be substantially improved and the incidence of failures or warranty repairs drastically reduced if the wires and connectors can be eliminated from the seat subsystem.

Today, there are switches located on the seat or at other locations in the vehicle for controlling the forward and backward motions, up and down motions, and rotation of the seat and seat back. These switches are connected to the appropriate motors by wires. Additionally, many seats now contain an airbag that must communicate with a sensor located, for example, in the vehicle door. Many occupant presence sensors and weight sensing systems are also appearing on vehicle seats. Finally, some seats contain heaters and cooling elements, vibrators, and other comfort and convenience devices that require wires and switches.

As an example let us now look at weight sensing. Under the teachings of this invention, silicon strain gage weight sensors can be placed on the bolts that secure each seat to the slide mechanism as shown in FIG. 10. These strain gage subsystems can contain sufficient electronics and inductive pickup coils so as to receive their operational energy from a pair of wires appropriately placed beneath the seats. The seat weight measurements can then be superimposed on the power frequency or transmitted wirelessly using RF or other convenient wireless technology. Other weight sensing technologies such as bladders and pressure sensors or two-dimensional resistive deflection sensing mats can also be handled in a similar manner.

Other methods of seat weight sensing include measuring the deflection of a part of the seat or the deflection of the bolts that connect the seat to the seat slide. For example, the strain in a bolt can be readily determined using wire or silicon strain gages, optical fiber strain gages, time of flight of ultrasonic waves traveling through the strained bolt, or the capacitive change of two appropriately position capacitor plates.

Using the loosely coupled inductive system, power in excess of a kilowatt can be readily transferred to operate seat position motors without the use of directly connected wires. Naturally, the switches can also be coupled into the inductive system without any direct wire connections and the switches, which now can be placed on the door armrest or on the seat as desired, can provide the information to control the seat motors. Additionally, since microprocessors will now be present on every motor and switch, the classical problem of the four-way seat system to control three degrees of freedom can be easily solved.

In current four-way seat systems, when an attempt is made to vertically raise the seat, the seat also rotates. Similarly, when an attempt is made to rotate the seat, it also invariably moves either up or down. This is because there are four switches to control three degrees of freedom and thus there is an infinite combination of switch settings for each seat position setting. This problem can be easily solved with an algorithm that translates the switch settings to the proper motor positions.

The positions of the seat, seatback, and headrest, can also be readily monitored without having direct wire connections to the vehicle. This can be down in numerous ways beginning with the encoder system that is currently in use and ending with simple RFID radar reflective tags that can be interrogated by a remote RFID tag reader. Based on the time of flight of radar waves, the positions of all of the desired surfaces of the seat can be instantly determined wirelessly.

Airbag Systems

The airbag system currently involves a large number of wires that carry information and power to and from the airbag central processing unit. Some vehicles have sensors mounted in the front of the vehicle and many vehicles also have sensors mounted in the side doors. In addition there are sensors and an electronic control module mounted in the passenger compartment. All cars now have passenger and driver airbags and some vehicles have as many as eight airbags considering the side impact torso airbag and head airbags as well as knee bolster airbags.

To partially cope with this problem, there is a movement to connect all of the safety systems onto a single bus (see, for example, U.S. patent application Ser. No. 09/356,314). Once again, the biggest problem with the reliability of airbag systems is the wiring and connectors. By practicing the teachings of this invention, one single pair of wires can be used to connect all of the airbag sensors and airbags together and to do so without the use of connectors. Thus the reliability of the system is substantially improved and the reduced installation costs more than offsets the added cost of having a loosely coupled inductive network.

Steering Wheel

The steering wheel of an automobile is becoming more complex as more functions are incorporated utilizing switches and/or a mouse touch pad on the steering wheel. Many vehicles have controls for heating and air conditioning, cruise control, radio, etc. Additionally the airbag must have a very high quality connection so that it reliably deploys even when an accident is underway.

This has resulted in the use of clock spring ribbon cables that make all of the electrical connections between the vehicle and the rotating steering wheel. The ribbon cable must at least able to carry sufficient current to reliably initiate airbag deployment even at very cold temperatures. This requires that the ribbon cable contain at least two heavy conductors to bring power to the airbag. Under the airbag network concept, a capacitor or battery is used within the airbag module and kept charged thereby significantly reducing the amount of current that must pass through the ribbon cable. Thus the ribbon cable can be kept considerably smaller.

An alternate and preferred solution uses the teachings of this invention to inductively couple the steering wheel with the vehicle thus eliminating all wires and connectors. All of the switch functions, control functions, and airbag functions are multiplexed on top of the inductive carrier frequency. This greatly simplifies the initial installation of the steering wheel onto the vehicle since the complicated ribbon cable is no longer necessary. Similarly, it reduces warranty repairs caused by people changing steering wheels without making sure that the ribbon cable is properly positioned.

Door Subsystem

More and more electrical functions are also being placed into vehicle doors. This includes window control switches and motors as well as seat control switches, airbag crash sensors, etc. As a result the bundle of wires that must pass through the door edge and through the A-pillar has become a serious assembly and maintenance problem in the automotive industry. Using the teachings of this invention, the loosely coupled inductive system could pass anywhere near the door and an inductive pickup system placed on the other side where it obtains power and exchanges information when the mating surfaces are aligned. If these surfaces are placed in the A-pillar, then sufficient power can be available even when the door is open. Alternately, a battery or capacitive storage system can be provided in the door and the coupling can exist through the doorsill, for example. This eliminates the need for wires to pass through the door interface and greatly simplifies the assembly and installation of doors. It also greatly reduces warranty repairs caused by the constant movement of wires at the door and car body interface.

Blind Spot Monitor

A driver executing a lane change when there is another vehicle in his blind spot causes many accidents. As a result, several firms are developing blind spot monitors based on radar, optics, or passive infrared, to detect the presence of a vehicle in the driver's blind spot and to warn the driver should he attempt such a lane change. These blind spot monitors are typically placed on the outside of the vehicle near or on side rear view mirror. Since the device is exposed to rain, salt, snow etc., there is a reliability problem resulting from the need to seal the sensor and to permit wires to enter the sensor and also the vehicle. Special wire, for example, should used to prevent water from wicking through the wire. These problems as well as similar problems associated with other devices which require electric power and which are exposed to the environment, such as forward mounted airbag crash sensors, can be solved utilizing and inductive coupling techniques of this invention.

Truck to Trailer Power and Information Transfer

A serious source of safety and reliability problems results from the flexible wire connections that are necessary between a truck and a trailer. The need for these flexible wire connections and their associated connector problems can be eliminated using the inductive coupling techniques of this invention. In this case the mere attachment of the trailer to the tractor automatically aligns an inductive pickup device on the trailer with the power lines imbedded in the fifth wheel.

Wireless Switches

Switches in general do not consume power and therefore they can be implemented wirelessly according to the teachings of this invention in many different modes. For a simple on off switch a one bit RFID tag similar to what is commonly used for protecting against shoplifting in stores with a slight modification can be easily implemented. The RFID tag switch would contain its address and a single accessible bit permitting the device to be interrogated regardless of its location in the vehicle without wires.

As the switch function becomes more complicated, additional power may be required and the options for interrogation become more limited. For a continuously varying switch, for example the volume control on a radio, it may be desirable to use a more complicated design where an inductive transfer of information is utilized. On the other hand, by using momentary contact switches that would set the one bit on only while the switch is activated and by using the duration of activation than volume control type functions can still be performed even though the switch is remote from the interrogator.

This concept then permits the placement of switches at arbitrary locations anywhere in the vehicle without regard to the placement of wires. Additionally, multiple switches can be easily used to control the same device or a single switch can control many devices.

For example, a switch to control the forward and rearward motion of the driver seat can be placed on the driver door mounted armrest and interrogated by RFID reader located in the headliner of the vehicle. The interrogator periodically monitors all RFID switches located in the vehicle which may number over 100. If the driver armrest switch is depressed and the switch bit is changed from 0 to 1, the reader knows based on the address or identification number of the switch that the driver intends to operate his seat in a forward or reverse manner. A signal is then sent over the inductive power transfer line to the motor controlling the seat and the motor is commanded to move the seat either forward based on one switch ID or backward based on another switch ID. Thus, the switch in the armrest would actually contained two identification RFIDs one for forward movement of seat and one for rearward movement of the seat. As soon the driver ceases operating the switch, the switch state returns to 0 and a command is sent to the motor to stop moving the seat.

By this process as taught by this invention all of the 100 or so switches and other simple sensors can become wireless devices and vastly reduced the number of wires in a vehicle and vastly increase the reliability and reduce warranty repairs.

Wireless Lights

In contrast to switches, lights require power. The power required generally exceeds that which can be easily transmitted by RF or capacitive coupling. For lights to become wireless, therefore, inductive coupling is required. Now, however, it is no longer necessary to have light sockets, wires and connectors. Each light bulb will would be outfitted with an inductive pickup device and a microprocessor. The microprocessor processor listens to the information coming over the inductive pickup line and when it recognizes its address it activates an internal switch which turns on the light. The light bulb becomes a totally sealed, self-contained unit with no electrical connectors for connections to the vehicle. It is automatically connected by mounting in a holder and by the proximity which can be as far away as several inches, to the inductive power line. It has been demonstrated that power transfer efficiencies of up to 99 percent can be achieved by this system and power levels exceeding 1 kW can be transferred to a device.

This invention therefore considerably simplifies the mounting of lights in a vehicle since the lights are totally self-contained and not plugged into the vehicle power system. Problems associated with sealing the light socket from the environment disappear vastly simplifying the installation of headlights, for example, into the vehicle. The skin of the vehicle need not contain any receptacles for a light plug and therefore there is no need to seal the light bulb edges to prevent water from entering behind the light bulb. Thus the reliability of vehicle exterior lighting systems is vastly improved. Similarly, the ease with which light bulbs can be changed when they burn out is vastly simplified since the complicated mechanisms for sealing the light bulb into the vehicle are no longer necessary. Although headlights were discussed the same principles apply to all other lights mounted on a vehicle exterior.

Since it is contemplated that the main power transfer wire pair will travel throughout the automobile in a single branched loop, several light bulbs can be inductive inductively attached to the inductive wire power supplier by merely locating a holder for the sealed light bulb within a few inches of the wire. Once again no electrical connections are required.

Considered for example the activation of the right turn signal. The microprocessor associated with the turn switch on the steering column is programmed to transmit the addresses of the right front and rear turn light bulbs to turn them on. A fraction of a second later, the microprocessor sends a signal over the inductive power transfer line to turn the light bulbs off. This is repeated for as long as the turn signal switch is placed in the activation position for a right turn. The right rear turn signal light bulb receives a message with its address and a bit set for light to be turned on and it responds by so doing and similarly the when the signal is received for turning the light off. Once again all such transmissions occurred over a single power and information inductive line and no wire connections are made to the light bulb. In this example, all power and information is transferred inductively.

Keyless Entry

The RFID technology is particularly applicable to keyless entry. Instead of depressing a button on a remote vehicle door opener, the owner of vehicle need only carry an RFID card in his pocket. Upon approaching the vehicle door, the reader located in the vehicle door, activates the circuitry in the RFID card and receives the identification number checks it and unlocks the vehicle if the code matches. Simultaneously, the vehicle now knows that this is driver No. 3, for example, and automatically sets the seat position, headrest position, mirror position, radio stations temperature controls and all other drivers specific functions including the positions of the petals to adapt vehicle to the particular driver. When the driver sits in the seat no ignition key is necessary and by merely depressing a switch which can be located anywhere in the vehicle, on the armrest for example, the vehicle motor starts. Naturally the switch can be wireless and the reader or interrogator which initially read the operators card can be connected inductively to the vehicle power system.

Road Conditioning Sensing—Black Ice Warning

A frequent cause of accidents is the sudden freezing of roadways or bridge surfaces when the roadway is wet and temperatures are near freezing. Sensors exist that can detect the temperature of the road surface within less than one degree. These sensors should be mounted in locations where they have a clear view of the road and thus they are susceptible to assault from rain, snow, ice, salt etc. The reliability of connecting these sensors into the vehicle power and information system is thus compromised. Using the teachings of this invention, black ice warning sensors can be mounted externally to the vehicle and coupled into the vehicle power and information system inductively, thus removing a significant cause of failure of such sensors.

Similar sensors can also used to detect the type of roadway on which the car is traveling. Gravel roads, for example, have typically a lower effective coefficient of friction than do concrete roads. Knowledge of the road characteristics can provide useful information to the vehicle control system and, for example, warn the driver when the speed driven is above what is safe for the road conditions.

Other Miscellaneous Sensors

Many new sensors are now being adapted to an automobile to increase the safety, comfort and convenience of vehicle occupants. Each of the sensors currently requires separate wiring for power and information transfer. Under the teachings of this invention these separate wires would become unnecessary and sensors could be added at will to the automobile at any location within a few inches of the inductive power line system or, in some cases, within view of an RFID interrogator. Even sensors that were not contemplated by the vehicle manufacturer can be added later with a software change to the appropriate vehicle CPU.

Such sensors include heat load sensors that measure the sunlight coming in through the windshield and adjust the environmental conditions inside the vehicle to compensate. Seatbelt sensors that indicate that the seatbelt is buckled can now also use RFID technology as can low power microphones. Door open or door ajar sensors also can use the RFID technology and would not need to be placed near an inductive power line. Gas tank fuel level and other fluid level sensors which do not require external power and are now possible thus eliminating any hazard of sparks igniting the fuel in the case of a rear impact accident which ruptures the fuel tank, for example. Capacitive proximity sensors that measure the presence of a life form within a few meters of the automobile can be coupled wirelessly to the vehicle. Cameras or other vision or radar sensors that can be mounted external to the vehicle and not require unreliable electrical connections to the vehicle power system permitting such sensors to be totally sealed from the environment are also now possible. Such sensors can be based on millimeter wave radar, passive or active infrared, or optical or any other portion of the electromagnetic spectrum that is suitable for the task. Radar or ultrasonic backup sensors or rear impact anticipatory sensors also are now feasible with significantly greater reliability.

Heretofore we have discussed the use of radio frequency to interrogate an RFID tag. Naturally other forms of electromagnetic radiation are possible. For example, an infrared source can illuminate an area inside the vehicle and a pin diode or CMOS camera can receive reflections from corner cube reflectors located on objects that move within the vehicle. These objects would include items such as the seat, seatback, and headrest. Through this technique the time of flight, by pulse or phase lock loop technologies, of the modulated IR radiation can be measured to each of the corner cube reflectors and the distance to the reflector thereby determined.

The above discussion has concentrated on applications primarily inside of the vehicle. There are also a significant number of applications concerning the interaction of a vehicle with its environment. Here we may deviate from the primary premise of this invention which is that the device that we are concerned with be either powerless in the sense that no power is required other than perhaps that which can be obtained from a radio frequency signal or a powered device and where the power is obtained through induction coupling.

When looking exterior to the vehicle, devices that interact vehicle may be located sufficiently far away that they will require power and that power cannot be obtained from the automobile. In the discussion below we will consider two types of such devices, the first type which does not require infrastructure-supplied power and the second which does.

A rule of thumb is that an RFID tag of normal size that is located more than one meter away from the reader or interrogator must have a battery. Exceptions to this involve cases where the only information that is transferred is due to the reflection off of a radar reflector type device and for cases where the tag is physically larger. For those cases a purely passive RFID can be five and sometimes more meters away from the interrogator. Nevertheless we shall assume that if the device is more than a few meters away that the device must contain some kind of external power supply.

The first interesting application is a low-cost form of adaptive cruise control or forward collision avoidance system. In this case a purely passive RFID tag would be placed on every rear license plate in a particular geographical area, such as a state. The subject vehicle would contain two readers, one on the forward left side of the vehicle and one on the forward right side. Upon approaching the rear of a car having the RFID license plate, the interrogators in the vehicle would be able to determine the distance, by way of reflected signal time of flight, from each reader to the license plate transducer. If the license plate RFID is passive than we are probably limited to a 5 meter range depending on the size of the tag. Nevertheless, this will be sufficient to determine that there is a vehicle in front of or to the right or left side of subject vehicle. If the relative velocity of the two vehicles is such that a collision will occur, the subject vehicle can automatically have its speed altered so as to prevent the collision, typically a rear end collision.

Systems are under development which will permit an automobile to determine its location absolutely on the surface of the earth. These systems are being developed in conjunction with intelligent transportation systems. Such location systems are frequently based on differential GPS (DGPS). One problem with such systems is that the appropriate number of GPS satellites is not always within view of the automobile. For such cases it is necessary to have an earth-based system which will provide the information to the vehicle permitting it to absolutely locate itself within a few centimeters. One such system can involve the use of RFID tags placed above, adjacent or below the surface of the highway.

For the cases where the RFID tag are located more than a few meters from the vehicle a battery will probably be required and this will be discussed below. For the systems without batteries, such as placing the RFID tag in the concrete, once again having two readers located one on each side of the vehicle, the location of the tag embedded in the concrete can be precisely determine based on the time of flight of the radar pulse from the reader to the tag and back. Using this method the precise location of the vehicle relative to the tag within a few centimeters can be readily determined and since the position of the tag will be absolutely known by virtue of an in vehicle resident digital map, the position of the vehicle can be absolutely determined regardless of where the vehicle is. For example if the vehicle is in a tunnel then it will know precisely its location from the RFID pavement embedded tags.

It is also possible to determine the relative velocity of the vehicle relative to the RFID tag using the Doppler effect based on the reflected signals. For tags located on license plates, the closing velocity of the two vehicles can be determined and for tags located in or adjacent to the highway pavement, once again, the velocity of the vehicle can be readily determined. Naturally, the velocity can in both cases be determined based on differentiating two distance measurements.

In many cases, it may be necessary to provide power to the RFID tag since the distance to the vehicle will exceed a few meters. This is currently being used in reverse for automatic tolling situations where the RFID tag is located on the vehicle and interrogated using readers located at the toll both.

When the RFID tag is to be interrogated by vehicle-mounted readers is more than a few meters from the vehicle, the tag in many cases must be supplied with power. This power can come from a variety of sources including a battery which is part of the device, direct electrical connections to a ground wire system, solar batteries, or inductive energy transfer from a power line.

For example, if an RFID tag were to be placed on a light post in downtown Manhattan, sufficient energy could be obtained from an inductive pickup from the wires used to power the light to recharge a battery in the RFID. Thus, when the lights are turned on at night, the RFID battery could be recharged sufficiently to provide power for operation 24 hours a day. In other cases, a battery would be included in the device and replacement of the battery would be necessitated periodically, perhaps once every two years.

An alternate approach to having a vehicle transmit a pulse to the tag and wait for a response would be to have the tag periodically broadcast a few waves of information at precise timing increments. Then, once again, the vehicle with two receivers could locate itself accurately relative to the earth-based transmitter.

For example, in downtown Los Angeles it would be difficult to obtain information from satellites that are constantly blocked by tall buildings. Nevertheless, inexpensive transmitters could be placed on a variety of lampposts that would periodically transmit a pulse to all vehicles in the vicinity. Such a system could be based on a broadband micropower impulse radar system as disclosed in several U.S. patents. Alternately, a narrow band signal could be used.

Once again, although radar type microwave pulses have been discussed, other portions of the electromagnetic spectrum could be utilized. For example, a vehicle could send a beam of modulated infrared toward infrastructure-based devices such as poles which contain corner reflectors. The time of flight of IR radiation from the vehicle to the reflectors can be accurately measured and since the vehicle would know, based on accurate maps, where the reflector is located, there is the little opportunity for an error.

Numerous modifications, variations, and adaptations may be made to the particular embodiments of the invention described above without departing from the scope of the invention, which is defined in the claims.

We claim:

1. A vehicle including an arrangement for monitoring tires mounted to the vehicle, at least two of the tires being mated, comprising thermal radiation detecting means arranged external of and apart from the tires, said thermal radiation detecting means being structured and arranged to detect the temperature of the tires, processor means coupled to said thermal radiation detecting means and arranged to receive the detected temperature of the tires and determine whether a difference in thermal radiation is present between the mated tires, and response means coupled to said processor means for responding to the determined difference in thermal radiation between mated pairs of the tires.

2. The vehicle of claim 1, further comprising power receiving means coupled to said thermal radiation detecting moans and structured and arranged to receive power wirelessly and to supply the received power to said thermal radiation detecting means.

3. The vehicle of claim 2, wherein the vehicle includes a source of inductive coupled power proximate said power receiving means and through which current flows, said power receiving means being arranged to receive power inductively from said inductive power source.

4. The vehicle of claim 2, wherein said power receiving means comprise an electronic circuit for receiving power through radio frequency energy transfer.

5. The vehicle of claim 1, further comprising coupling means for coupling said thermal radiation detecting means to said processor means.

6. The vehicle of claim 5, wherein said coupling means comprise a transmitter mounted in connection with said thermal radiation detecting device and a receiver mounted in connection with or integrated into said processor means such that the detected temperature of the tires is transmitted wirelessly from said thermal radiation detecting means to said processor means.

7. The vehicle of claim 1, wherein said thermal radiation detecting means comprise infrared radiation receivers each arranged to have a clear field of view of at least one of the tires.

8. The vehicle of claim 1, wherein the vehicle includes a tire well around each of the tires, said thermal radiation detection means being arranged in said tire wells.

9. The vehicle of claim 1, wherein said response means comprise an alarm for emitting noise into the passenger compartment.

10. The vehicle of claim 1, wherein said response means comprise at least one of a display for displaying an indication or representation of the determined difference in thermal radiation between mated pairs of the tires and a warning light for emitting light into the passenger compartment from a specific location.

11. The vehicle of claim 1, wherein said response means comprise a telecommunications unit structured and arranged to send a signal to a remote vehicle service facility.

12. The vehicle of claim 1, wherein said thermal radiation detecting means comprising detector means for generating an output signal responsive to thermal emitted radiation;

means for defining first and second fields of view relative to said detector means, said first field of view encompassing a first one of the mated tires and said second field of view encompassing a second one of the mated tires; and switching means for switching the field of view detected to generate a combined output signal;

said processor means deriving an indication of a difference in thermal radiation between the mated tires from the combined output signal.

13. The vehicle of claim 12, wherein said detector means comprises a differential thermal emitted radiation detector.

14. The vehicle of claim 12, wherein said means for defining first and second fields of view comprise optics having first and second optical elements.

15. The vehicle of claim 14, wherein said first and second optical elements are Fresnel lenses.

16. The vehicle of claim 12, wherein said means for defining first and second fields of view comprise optics having a single optical element capable of movement between a first position and a second position corresponding to respective first and second fields of view.

17. The vehicle of claim 16, wherein said switching means comprises a vibrator for effecting movement of said optics between the first and second positions corresponding to allowing respective first and second fields of view to be detected.

18. The vehicle of claim 12, wherein said switching means comprises a shutter operable between first and second positions corresponding to allowing respective first and second fields of view to be detected.

19. The vehicle of claim 18, wherein said shutter includes an opaque panel pivotally mounted between said detector means and said means for defining first and second fields of view, a spring biasing said panel to the first position and an electromagnet for attracting said panel to the second position.

20. A method for monitoring tires mounted to a vehicle, comprising the steps of:
    detecting the temperature of the tires by means of detectors located external of and apart from the tires,
    determining whether a difference in temperature is present between associated mated pairs of the tires, and
    responding to the determined difference in thermal radiation between mated pairs of the tires.

21. The method of claim 20, wherein the temperature of the tires is detected by at least one thermal radiation detecting device.

22. The method of claim 21, further comprising the step of:
    supplying power wirelessly to the at least one thermal radiation detecting device.

23. The method of claim 21, further comprising the step of:
    coupling the at least one thermal radiation detecting device to circuitry capable of receiving power inductively from a source of inductive coupled power.

24. The method of claim 21, further comprising the step of:
    arranging a radio frequency energy transfer device in connection with the at least one thermal radiation detecting device to enable energy to be transferred to the at least thermal radiation detecting device through radio frequency energy transfer.

25. The method of claim 20, further comprising the step of:
    transmitting the detected temperature of the tires from the detectors to a processor remote from the transmitters, the difference in temperature between associated mated pairs of tires being determined in the processor.

26. The method of claim 20, wherein the step of detecting the temperature of the tires comprises the step of:
    arranging infrared radiation receivers on the vehicle, each having a clear field of view of at least one of the tires.

27. The method of claim 26, further comprising the step of:
    mounting the infrared radiation receivers in tire wells around each of the tires.

28. The method of claim 20, wherein the step of responding to the determined difference in temperature between associated mated pairs of tires comprises the step of emitting noise into the passenger compartment.

29. The method of claim 20, wherein the step of responding to the determined difference in temperature between associated mated pairs of tires comprises the step of at least one displaying an indication or representation of the determined difference in thermal radiation between mated pairs of the tires and emitting light into the passenger compartment from a specific location.

30. The method of claim 20, wherein the step of responding to the determined difference in temperature between associated mated pairs of tires comprises the step of sending a signal to a remote vehicle service facility.

31. The method of claim 20, wherein the step of responding to the determined difference in temperature between associated mated pairs of tires comprises the step of determining whether the determined difference in temperature is above a predetermined threshold and responding to the determined difference in temperature only if the determined difference is above the predetermined threshold.

32. A vehicle including an arrangement for monitoring tires mounted to the vehicle, comprising
    thermal radiation detecting means arranged external of and apart from the tires and associated rotating parts, said thermal radiation detecting means being structured and arranged to detect the temperature of the tires,
    processor means coupled to said thermal radiation detecting means and arranged to receive the detected temperature of the tires and analyze the detected temperature of the tires, and
    response means coupled to said processor means for responding to the analysis of the detected temperature of the tires.

33. The vehicle of claim 32, wherein said processor means analyze the detected temperature of the tires relative to a threshold and said response means responding to the analysis of the detected temperature of the tires relative to the threshold.

34. The vehicle of claim 32, further comprising power receiving means coupled to said thermal radiation detecting means and structured and arranged to receive power wirelessly and to supply the received power to said thermal radiation detecting means.

35. The vehicle of claim 34, wherein the vehicle includes a source of inductive coupled power proximate said power receiving means and through which current flows, said power receiving means being arranged to receive power inductively from said inductive power source.

36. The vehicle of claim 34, wherein said power receiving means comprise an electronic circuit for receiving power through radio frequency energy transfer.

37. The vehicle of claim 32, further comprising coupling means for coupling said thermal radiation detecting means to said processor means.

38. The vehicle of claim 37, wherein said coupling means comprise a transmitter mounted in connection with said thermal radiation detecting device and a receiver mounted in connection with or integrated into said processor means such that the detected temperature of the tires is transmitted wirelessly from said thermal radiation detecting means to said processor means.

39. The vehicle of claim 32, wherein said thermal radiation detecting means comprise infrared radiation receivers each arranged to have a clear field of view of at least one of the tires.

40. The vehicle of claim 32, wherein the vehicle includes a tire well around each of the tires, said thermal radiation detection means being arranged in said tire wells.

41. The vehicle of claim 32, wherein said response means comprise an alarm for emitting noise into the passenger compartment.

42. The vehicle of claim 32, wherein said response means comprise at least one of a display for displaying an indication or representation of the analysis of the detected temperature of the tires and a warning light for emitting light into the passenger compartment from a specific location.

43. The vehicle of claim 32, wherein said response means comprise a telecommunications unit structured and arranged to send a signal to a remote vehicle service facility.

44. A method for monitoring tires mounted to a vehicle, comprising the steps of:
arranging tire temperature detectors external of and apart from the tires and associated rotating parts,
detecting the temperature of the tires by means of the detectors,
analyzing the detected temperature of the tires, and
responding to the analysis of the detected temperature of the tires.

45. The method of claim 44, wherein the detectors include at least one thermal radiation detecting device.

46. The method of claim 45, further comprising the step of:
supplying power wirelessly to the at least one thermal radiation detecting device.

47. The method of claim 45, further comprising the step of:
coupling the at least one thermal radiation detecting device to circuitry capable of receiving power inductively from a source of inductive coupled power.

48. The method of claim 45, further comprising the step of:
arranging a radio frequency energy transfer device in connection with the at least one thermal radiation detecting device to enable energy to be transferred to the at least thermal radiation detecting device through radio frequency energy transfer.

49. The method of claim 44, further comprising the step of:
transmitting the detected temperature of the tires from the detectors to a processor remote from the transmitters, the analysis of the detected temperature of the tires being performed in the processor.

50. The method of claim 44, wherein the detectors include infrared radiation receivers, further comprising the step of arranging the infrared receivers such that each has a clear field of view of at least one of the tires.

51. The method of claim 50, further comprising the step of:
mounting the infrared radiation receivers in tire wells around each of the tires.

52. The method of claim 44, wherein the step of responding to the analysis of the detected temperature of the tires comprises the step of emitting noise into the passenger compartment.

53. The method of claim 44, wherein the step of responding to the analysis of the detected temperature of the tires comprises the step of at least one displaying an indication or representation of the determined difference in thermal radiation between mated pairs of the tires and emitting light into the passenger compartment from a specific location.

54. The method of claim 44, wherein the step of responding to the analysis of the detected temperature of the tires comprises the step of sending a signal to a remote vehicle service facility.

55. The method of claim 44, wherein the step of analyzing the detected temperature of the tires comprises the step of analyzing the detected temperature of the tires relative to a threshold and the step of responding to the analysis of the detected temperature of the tires comprises the step of responding to the analysis of the detected temperature of the tires relative to the threshold.

56. The method of claim 55, further comprising the step of:
varying the threshold based on the environment in which the tires are situated.

57. The method of claim 55, further comprising the step of:
varying the threshold based on the load of the vehicle on the tires.

58. A vehicle including an arrangement for monitoring tires mounted to the vehicle, comprising
thermal radiation detecting means arranged external of and apart from the tires and associated rotating parts for detecting the temperature of the tires, said thermal radiation detecting means comprising infrared radiation receivers each arranged to have a clear field of view of at least one of the tires,
processor means coupled to said thermal radiation detecting means for receiving the detected temperature of the tires and analyzing the detected temperature of the tires, and
response means coupled to said processor means for responding to the analysis of the detected temperature of the tires.

59. A vehicle including tires, a tire well around each of the tires and an arrangement for monitoring tires mounted to the vehicle, comprising
thermal radiation detecting means arranged external of and apart from the tires for detecting the temperature of the tires, said thermal radiation detection means being arranged in said tire wells,
processor means coupled to said thermal radiation detecting means for receiving the detected temperature of the tires and analyzing the detected temperature of the tires, and
response means coupled to said processor means for responding to the analysis of the detected temperature of the tires.

60. A vehicle including an arrangement for monitoring tires mounted to the vehicle, at least two of the tires being mated, comprising
thermal radiation detecting means arranged external of and apart from the tires for detecting the temperature of the tires, said thermal radiation detecting means comprising detector means for generating an output signal responsive to thermal emitted radiation, means for defining first and second fields of view relative to said detector means, said first field of view encompassing a first one of the mated tires and said second field of view encompassing a second one of the mated tires, and switching means for switching the field of view detected to generate a combined output signal;
processor means coupled to said thermal radiation detecting means for receiving the detected temperature of the tires and determining whether a difference in thermal radiation is present between the mated tires, said processor means deriving an indication of a difference in thermal radiation between the mated tires from the combined output signal, and
response means coupled to said processor means for responding to the determined difference in thermal radiation between mated pairs of the tires.

* * * * *